(12) United States Patent
Abou Shousha

(10) Patent No.: US 12,196,955 B2
(45) Date of Patent: *Jan. 14, 2025

(54) PUPIL CHARACTERISTIC DETECTION AND SPECTACLES CORRECTION/ADJUSTMENT BASED THEREON

(71) Applicant: Heru Inc., Miami, FL (US)

(72) Inventor: Mohamed Abou Shousha, Fort Lauderdale, FL (US)

(73) Assignee: HERU INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,321

(22) Filed: Oct. 5, 2023

(65) Prior Publication Data

US 2024/0027754 A1 Jan. 25, 2024

Related U.S. Application Data

(63) Continuation of application No. 17/538,811, filed on Nov. 30, 2021, now Pat. No. 11,808,939.

(51) Int. Cl.
*G02B 27/00* (2006.01)
*G02B 27/01* (2006.01)

(52) U.S. Cl.
CPC ....... *G02B 27/0093* (2013.01); *G02B 27/017* (2013.01); *G02B 2027/0178* (2013.01)

(58) Field of Classification Search
CPC .................................................. G02B 27/0093
See application file for complete search history.

(56) References Cited

U.S. PATENT DOCUMENTS

| | | | |
|---|---|---|---|
| 2016/0018654 A1* | 1/2016 | Haddick | G06F 3/0304 345/8 |
| 2017/0184847 A1* | 6/2017 | Petrov | H04N 23/56 |
| 2019/0041643 A1* | 2/2019 | Chang | H04N 13/398 |
| 2019/0258442 A1* | 8/2019 | Hudman | G02B 27/0176 |
| 2020/0081250 A1* | 3/2020 | Mohammed | G02B 30/40 |

* cited by examiner

*Primary Examiner* — William Boddie
*Assistant Examiner* — Andrew B Schnirel
(74) *Attorney, Agent, or Firm* — Foley & Lardner LLP

(57) ABSTRACT

In certain embodiments, pupil-related characteristic detection or spectacles correction/adjustment based thereon may be facilitated. In some embodiments, a stimulus may be presented at a location on a first display portion of the user device at a first time to cause a first eye of a user to fixate on the location. A stimulus may be presented at the location on a second display portion of the user device to cause a second eye of the user to fixate on the location at a time subsequent to the first time. Movement of the first or second eye to fixate on the location on the respective first or second display portion in connection with the stimulus presentation at the second time may be determined. In response to the movement of the first or second eye exceeding a threshold movement amount, a user profile may be generated that includes the user's pupil distance.

20 Claims, 17 Drawing Sheets

PUPIL CHARACTERISTIC DETECTION AND SPECTACLES CORRECTION/ADJUSTMENT BASED THEREON

CROSS-REFERENCE TO RELATED APPLICATION(S)

This application is a continuation of U.S. patent application Ser. No. 17/538,811, filed Nov. 30, 2021. The content of the foregoing application is incorporated herein in its entirety by reference.

BACKGROUND

Although "smart glasses" and other wearable technologies to assist the visually impaired exist, typical wearable technologies do not adequately address a number of issues associated with traditional glasses. For example, typical wearable technologies fail to address the pupil-related characteristics of users which can result in a user looking through the wrong part of the lens thereby causing eye strain, fatigue, blurred vision, distorted vision, headaches, or other eye/vision related issues. These and other drawbacks exist.

SUMMARY OF THE INVENTION

Aspects of the invention relate to methods, apparatuses, or systems for facilitating pupil-related characteristic detection or spectacles correction/adjustment based thereon. As an example, by properly correcting or adjusting a spectacles device's lenses or displays based on the user's pupil-related characteristics (e.g., moving the lenses or displays closer together or farther apart, adjusting the position of presentation of one or more objects onto the lenses or displays, etc.), the user may experience reduced eye-related issues (e.g., eye strain, fatigue, blurred vision, distorted vision, headaches, etc.).

While conventional systems may exist to aid visual impairment, these conventional systems typically cannot accurately or seamlessly detect pupil distances or other pupil-related characteristics. Furthermore, in the context of digital spectacles, even when such pupil-related characteristics are known, manufacturer customization of digital spectacles to account for differences in individual patient profiles generally results in higher manufacturing costs and delays.

To solve one or more of the foregoing technical problems, a spectacles device may detect one or more pupil-related characteristics of the user or adjust/correct one or more display portions of the spectacles device based on the user's pupil-related characteristics.

In some embodiments, one or more positions of a wearable device's displays may be adjusted based on one or more pupil-related characteristics of the user. In some embodiments, in connection with presentation of first and second stimuli at first and second times on first and second displays, respectively, the wearable device may determine an amount of movement of an eye of the user occurring (e.g., as a response to the presentation of the second stimulus after the presentation of the first stimulus). In response to a determination that the eye movement exceeded a threshold movement amount, the movement amount may be used to automatically adjust the positions of the displays, and a subsequent presentation of respective stimuli on the displays may be performed to determine whether the adjustment eliminates or reduces a subsequent corresponding eye movement. As an example, if there is no eye movement (or only eye movement below the threshold movement amount) resulting from presenting a stimulus at the center of the second display immediately after presenting a stimulus at the center of the first display, then the wearable device may confirm that the displays are properly adjusted for the user.

In some embodiments, the wearable device may determine a pupil distance between pupils of the user's eyes based on the movement amount of the eye (e.g., that occurred as a response to the presentation of the second stimulus after the presentation of the first stimulus) and perform the adjustment of the displays based on the determined pupil distance. As an example, the wearable device may determine the pupil distance based on the movement amount, respective distances between the center of each display and an edge of the display, a distance between the displays, or other information. The pupil distance may be used to generate a user profile associated with the user, and the user profile may be used to perform future adjustments of the wearable device's displays (e.g., where the wearable device may be worn by multiple users) or provided to one or more service providers to customize lenses or frames for the user.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
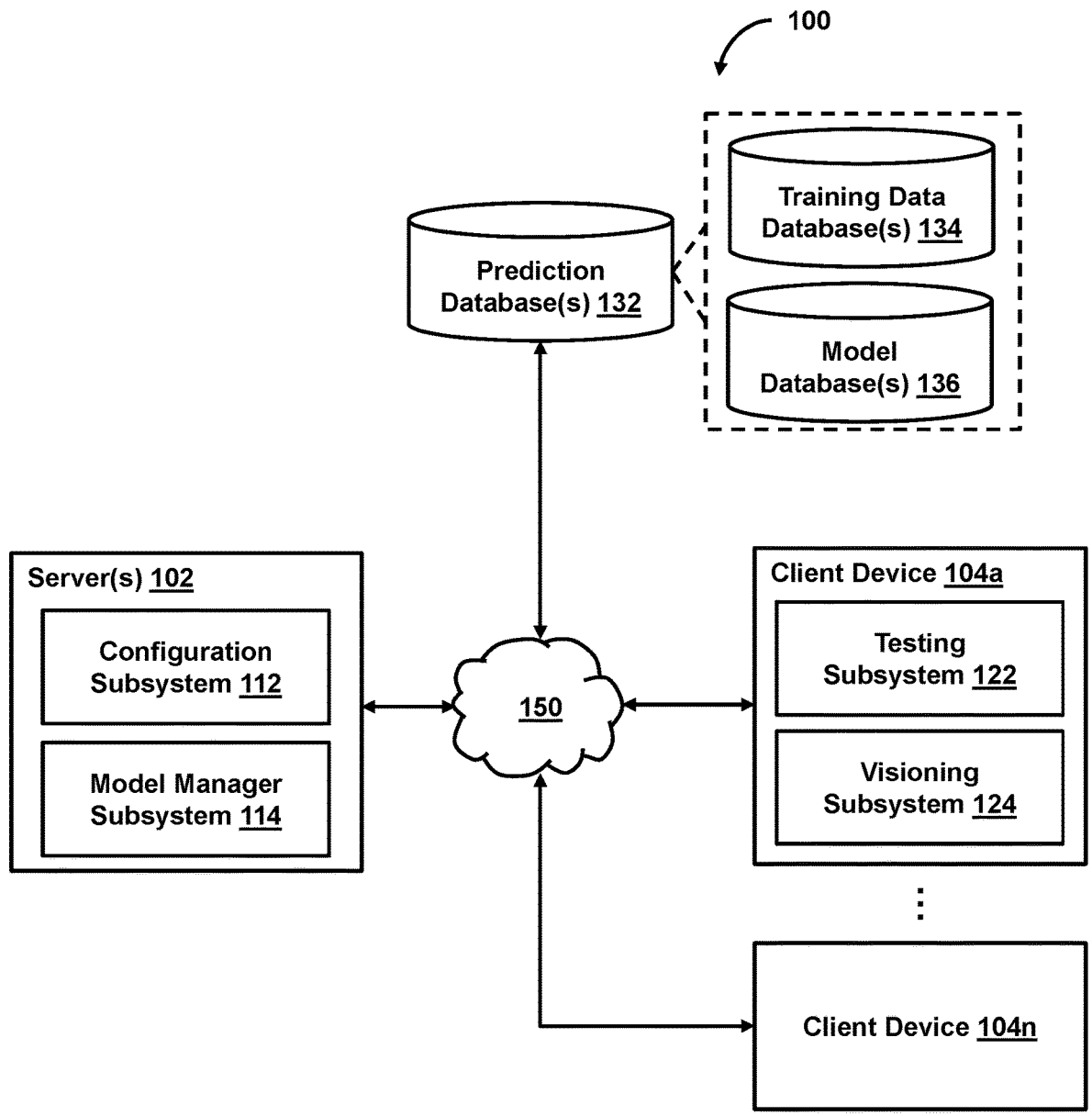
FIG. 1A illustrates a system for facilitating pupil-related characteristic detection or spectacles correction/adjustment based thereon, in accordance with one or more embodiments.

FIG. 1A shows a system 100 for facilitating pupil-related characteristic detection or spectacles correction/adjustment based thereon, in accordance with one or more embodiments. As shown in FIG. 1A, system 100 may include server(s) 102, client device 104 (or client devices 104a-104n), or other components. Server 102 may include configuration subsystem 112, model manager subsystem 114, or other components. Client device 104 may include testing subsystem 122, visioning subsystem 124, or other components. Each client device 104 may include any type of mobile terminal, fixed terminal, or other device. By way of example, client device 104 may include a user device, a desktop computer, a notebook computer, a tablet computer, a smartphone, a wearable device, or other client device. Users may, for instance, utilize one or more client devices 104 to interact with one another, one or more servers, or other components of system 100.

It should be noted that, while one or more operations are described herein as being performed by particular components of client device 104, those operations may, in some embodiments, be performed by other components of client device 104 or other components of system 100. As an example, while one or more operations are described herein as being performed by components of client device 104, those operations may, in some embodiments, be performed by components of server 102. It should also be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. It should further be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may provide a visual test presentation to a user, where the presentation including a set of stimuli (e.g., light stimuli, text, or images displayed to the user). During the presentation (or after the presentation), system 100 may obtain feedback related to the set of stimuli (e.g., feedback indicating whether or how the user sees one or more stimuli of the set, feedback related to the eye-movement of the subject, gaze direction of one or more eyes of the user, or other feedback). As an example, the feedback may include an indication of a response of the user to one or more stimuli (of the set of stimuli) or an indication of a lack of response of the user to such stimuli. The response (or lack thereof) may relate to an eye movement, a change in eye movement, a gaze direction, a change in gaze direction, a pupil size, a pupil size change, or other response (or lack thereof). As another example, the feedback may include an eye image (or a set of eye images) captured during the visual test presentation. The eye image may be an image of a retina of the eye (e.g., the overall retina or a portion thereof), an image of a cornea of the eye (e.g., the overall cornea or a portion thereof), or other eye image. As a further example, the feedback may include feedback related to the movement of one or more eyes of a subject. For instance, using one or more eye images obtained during presentation of the stimuli, the system may obtain feedback related to how one or more eyes of the subject move in relation to the presentation of the stimuli. Additionally or alternatively, system 100 may obtain feedback related to the eye movement of one or more eyes of the subject via one or more eye-tracking sensors during presentation of the stimuli.

In some embodiments, one or more prediction models may be used to facilitate determination of one or more pupil-related characteristics (e.g., a pupil distance between pupils of a user, one or more pupil sizes of the pupils of a user, one or more curvatures of the pupils of the user, or other pupil characteristics of a user), or other operations. In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function, and, as such, the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 1B:
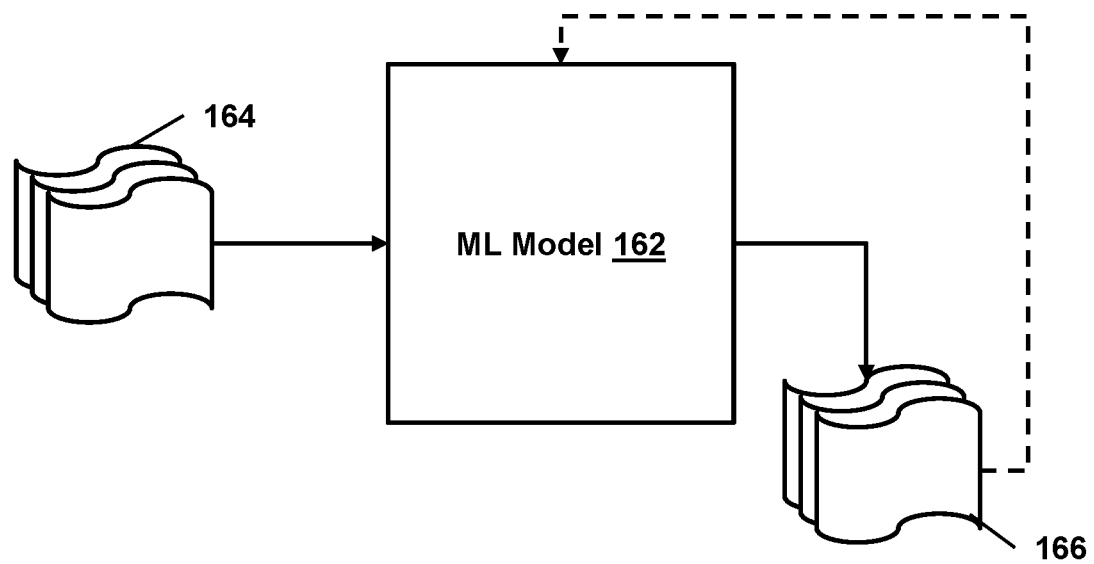
FIG. 1B illustrates a system implementing a machine learning model to facilitate pupil-related characteristic detection or spectacles correction/adjustment based thereon, in accordance with one or more embodiments.

As an example, with respect to FIG. 1B, machine learning model 162 may take inputs 164 and provide outputs 166. In one use case, outputs 166 may be fed back to machine learning model 162 as input to train machine learning model 162 (e.g., alone or in conjunction with user indications of the accuracy of outputs 166, labels associated with the inputs, or with other reference feedback information). In another use case, machine learning model 162 may update its configurations (e.g., weights, biases, or other parameters) based on its assessment of its prediction (e.g., outputs 166) and reference feedback information (e.g., pupil-related characteristics of a user, pupil distance of a user, or other information). In another use case, where machine learning model 162 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model may be trained to generate better predictions.

In some embodiments, upon obtaining feedback related to a set of stimuli (displayed to a user), feedback related to one or more eyes of the user, feedback related to one or more eye movements, feedback related to one or more eye gaze directions, feedback related to one or more locations of a set of stimuli, or other feedback, system 100 may provide the feedback to a prediction model, and the prediction model may be configured based on the feedback. As an example, the prediction model may be automatically configured for the user based on (i) an indication of a response of the user to one or more stimuli (of the set of stimuli), (ii) an indication of a lack of response of the user to such stimuli, (iii) one or more eye images captured during the visual test presentation, (iv) eye-movement of one or more eyes of the subject, (v) gaze directions of the eyes of the subject, (vi) the location of one or more stimuli, or (vii) other feedback (e.g., the prediction model may be personalized toward the user based on the feedback from the visual test presentation). As another example, the prediction model may be trained based on such feedback and other feedback from other users to improve accuracy of results provided by the prediction model. In some embodiments, upon the prediction model being configured (e.g., for the user), system 100 may determine the pupil-related characteristics of the user (e.g., pupil distance between the pupils of a user, one or more pupil sizes of one or more pupils of the user, one or more curvatures of the pupils of the user, or other pupil characteristics of the pupils of the user) to be used in one or more scenarios. In some embodiments, based on the pupil-related characteristics of a user, a wearable device of system 100 may be caused to adjust one or more displays, or lenses, or other components of the wearable device. Additionally or alternatively, the pupil-related characteristics of the user may be stored in a user profile, and, as such, the pupil-related characteristics of the user may be used by an optometrist for creating eye-glasses for the subject. In some embodiments, the user profile may also be used to perform future adjustments of the wearable device's displays where the wearable device is worn by multiple users. In this way, different users may wear the same wearable device, and the wearable device may automatically adjust the displays based on the pupil characteristics of each respective user.

In some embodiments, system 100 may facilitate wearable device adjustment/correction via one or more displays of the wearable device (e.g., adjustable wearable device lenses or displays, moveable wearable device lenses or displays, variable positioning wearable device lenses or displays etc.). As an example, with respect to a wearable device, the wearable device may include one or more displays or lenses. In some embodiments, the displays, lens, or other components of the wearable device may be self-adjusting based on one or more pupil-related characteristics of the user. For example, in some embodiments, the pupil-related characteristics of a user may include the pupil distance between the pupils of the user, one or more pupil sizes of the pupils of the user, one or more curvatures of the pupils of the user, or other pupil characteristics of the pupils of the user. In response to the system determining one or more pupil-related characteristics of the user, the displays of the wearable device may adjust/correct (e.g., left and right, up and down, closer together, farther apart, etc.) to "fit" the user. In this way, for example, the wearable device may automatically improve the user experience by mitigating eye strain, headaches, blurry vision, distorted vision, or other eye-related issues, such as those related to the positioning or shape of displays that are not appropriate for the user. It should be noted that, while one or more operations are described herein as being performed with respect to one or more displays of a wearable device, those operations may, in some embodiments, be performed with respect to one or more lenses of a wearable device (e.g., dynamically adjusting the lens of the wearable device based on the pupil-related characteristics of the user)

Figure 1C:
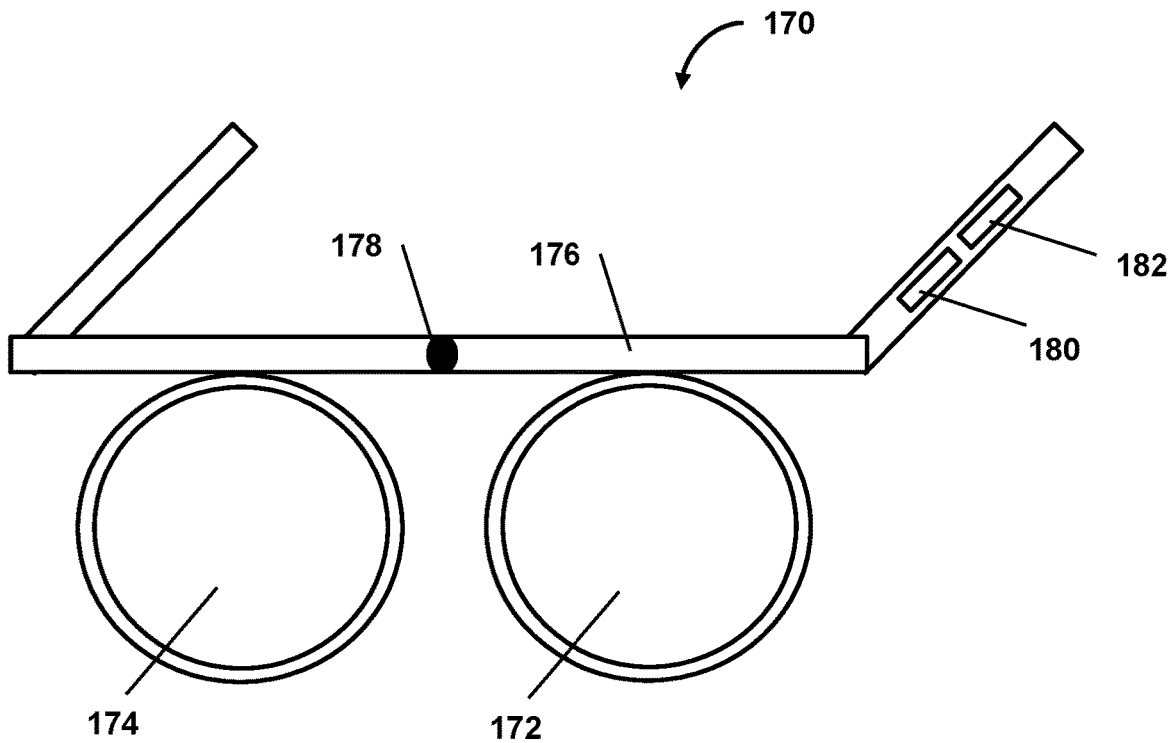
FIGS. 1C-1D illustrate views of example spectacles devices, in accordance with one or more embodiments.

In some embodiments, with respect to FIG. 1C, client device 104 may include a spectacles device 170 forming a wearable device for a subject. In some embodiments, the spectacles device 170 may be a part of a visioning system as described herein. The spectacles device 170 includes a left eyepiece 172 and a right eyepiece 174. Each eyepiece 172 and 174 may contain or associate with a digital monitor configured to display (e.g., provide on a screen or project onto an eye) images (e.g., stimuli) to a respective eye of the subject. In various embodiments, digital monitors may include displays, display screens, projectors, or other components to generate the image display on the display screen or project images onto an eye (e.g., a retina of the eye). It will be appreciated that digital monitors comprising projectors may be positioned at other locations to project images onto an eye of the subject or onto an eyepiece comprising a screen, glass, or other surface onto which images may be projected. In one embodiment, the left eye piece 172 and right eyepiece 174 may be positioned with respect to the housing 176 to fit an orbital area on the subject, and as such, each eyepiece 172, 174 is able to collect data and display/project image data, which in a further example includes displaying/projecting image data to a different eye.

The housing 176 may further include one or more outward facing sensors, which may be outward directed image sensors 178 comprising field of vision cameras. In other embodiments, fewer or additional outward directed image sensors 178 may be provided. The outward directed image sensors 178 may be configured to capture continuous images (e.g., of the user's field of vision, or other images).

The housing 176 may further include a power unit 180 and a processing unit 182. The power unit 180 may include one or more batteries, charging ports, or other power sources. The power unit may be configured to power one or more components of spectacles device 170. The processing unit 182 may include one or more computer processors, one or more electronic storage medium components (e.g., computer memory, Random Access Memory (RAM), etc.), one or more wired or wireless communication components (e.g., physical communication ports, cables, antenna, wireless transceivers, etc.), other control circuitry components, or other components.

Figure 1D:
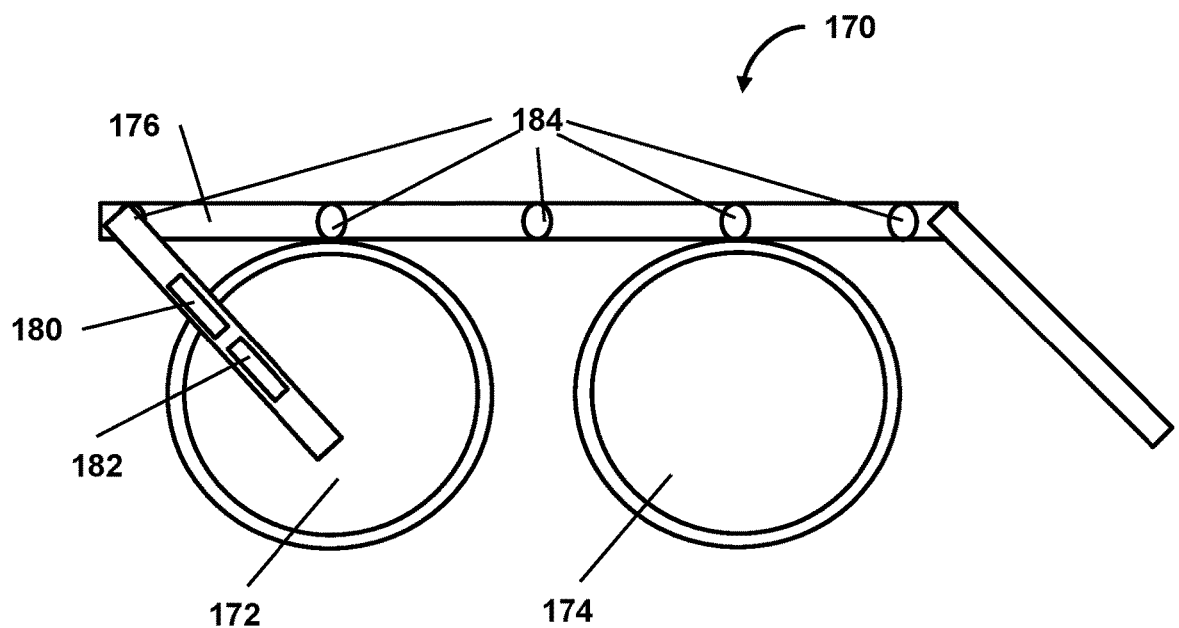

In some embodiments, with respect to FIG. 1D, the housing 176 may further include one or more inward directed sensors 184, which may be inward directed image sensors. In an example, inward directed sensors 184 may include infrared cameras, photodetectors, or other infrared sensors, configured to track pupil movement, to determine and track visual axes of the subject, to track and determine eye gaze directions, and to track and determine other eye-related movement. The inward directed sensors 184 (e.g., comprising infrared cameras) may be located in upper portions relative to the eye pieces 172, 174, so as to not block the visual field of the subject, neither their real visual field nor a visual field displayed or projected to the subject. The inward directed sensors 184 may be directionally aligned to point toward a presumed pupil region for better pupil or line of sight tracking. In some examples, the inward directed sensors 184 may be embedded within the eye pieces 172, 174 to provide a continuous interior surface.

Spectacles device 170 may further include one or more dynamic eyepieces (e.g., displays). For example, the left eyepiece 172 and right eyepiece 174 may be dynamic and allow each eyepiece to be adjustable. For example, left and right eye pieces 172, 174 may adjust (e.g., left and right, up and down, side to side, closer together, farther apart, etc.) to "fit" a user. For instance, based on one or more pupil-related characteristics of the user, spectacles device 170 or an associated visioning system may facilitate an adjustment of one or more eyepieces (e.g., eyepieces 172, 174) to allow a user's experience to improve (e.g., by mitigating one or more eye-related issues of the user).

Figure 2:
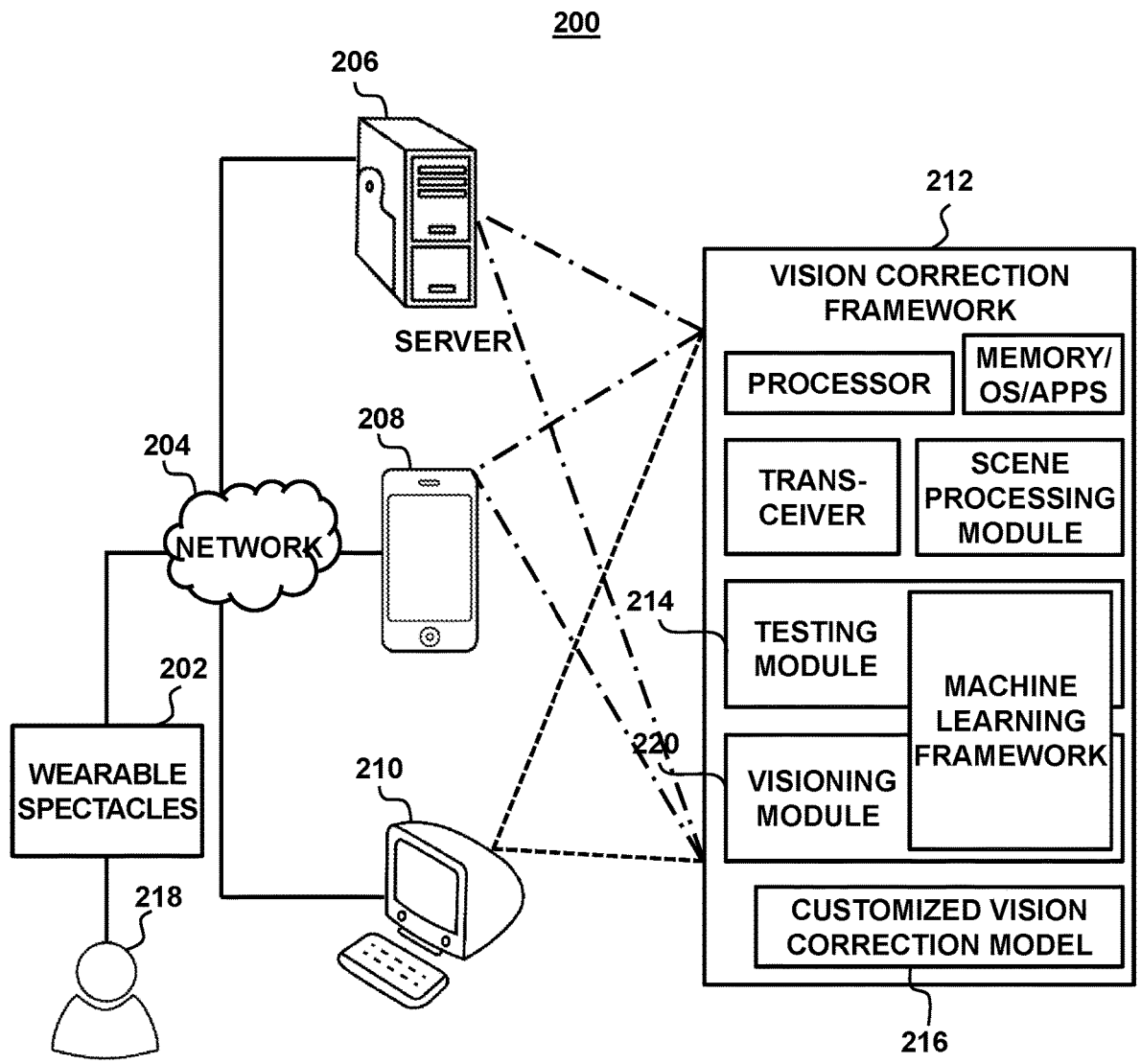
FIG. 2 illustrates an example vision system, in accordance with one or more embodiments.

In some embodiments, with respect to FIG. 2, system 100 may include vision system 200, which includes a spectacles device 202 communicatively coupled to a network 204 for communicating with a server 206, mobile cellular phone 208, or personal computer 210, any of which may contain a vision correction framework 212 for implementing the processing techniques herein, such as image processing techniques, which may include those with respect to the testing mode or visioning mode. In the illustrated example, the vision correction framework 212 includes a processor and a memory storing an operating system and applications for implementing the techniques herein, along with a transceiver for communicating with the spectacles device 202 over the network 204. The framework 212 contains a testing module 214, which includes a machine learning framework in the present example. The machine learning framework may be used along with a testing protocol executed by the testing module, to adaptively adjust the testing mode to more accurately assess ocular pathologies, in either a supervised or unsupervised manner. The result of the testing module operation may include development of a customized vision correction model 216 for a subject 218.

A visioning module 220, which in some embodiments may also include a machine learning framework having accessed customized vision correction models 216, to generate corrected visual images (e.g., stimuli) for display by the spectacles device 202. The vision correction framework 212 may also include a scene processing module which may process images for use during testing mode or visioning mode operations and may include operations described above and elsewhere herein with respect to a processing module. As described above and elsewhere herein, in some embodiments, the spectacles device 202 may include all or a portion of the vision correction framework 212.

In the testing mode, the spectacles device 170 or 202, and in particular the inward directed image sensors comprising tracking cameras, which may be positioned along an interior of the spectacles device 170 or 202, may be used to capture pupil and visual axis tracking data, eye gaze directions, or other eye characteristics that are used to accurately measure the subject's pupil distance and visual axis.

Figure 3:
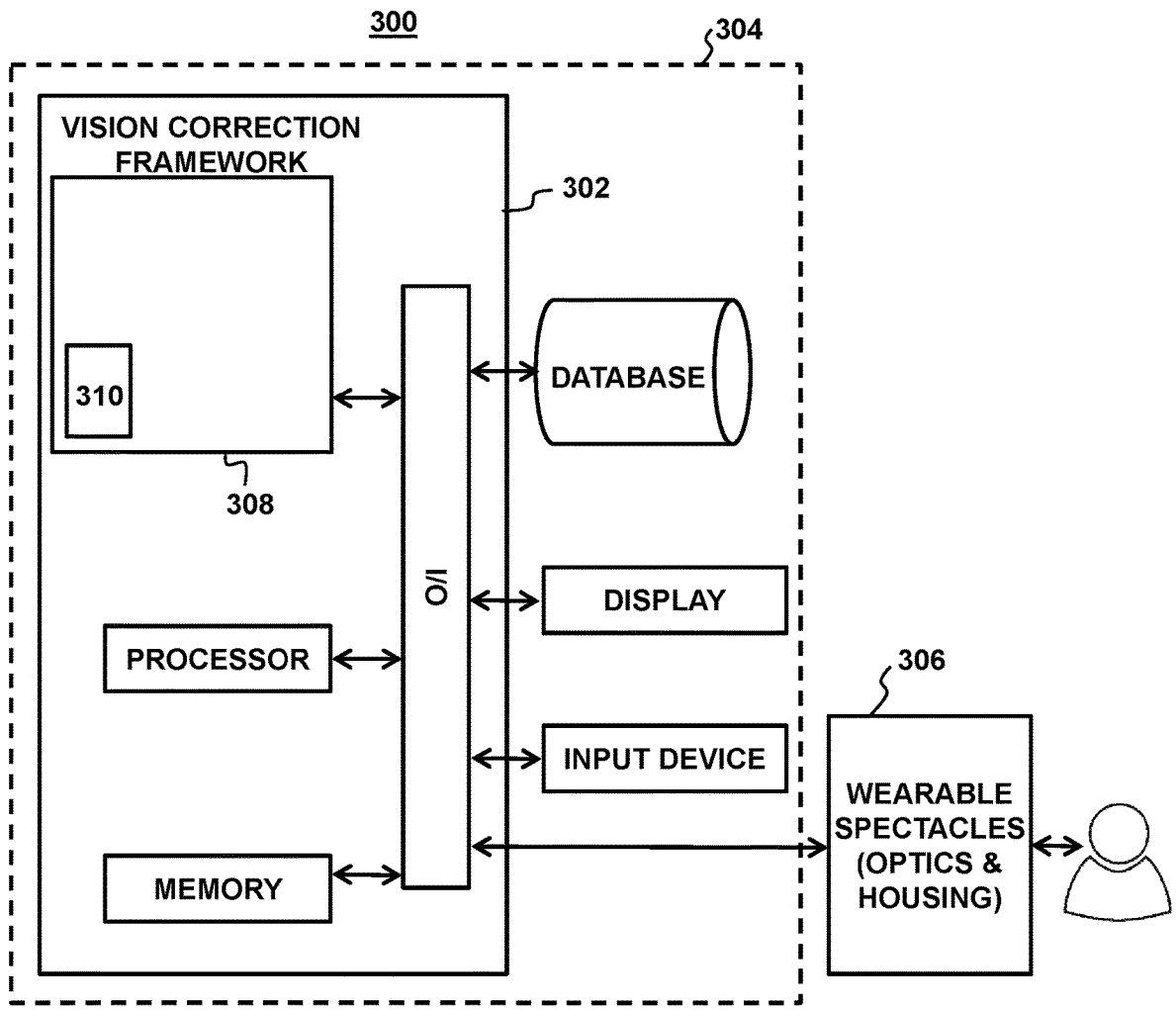
FIG. 3 illustrates a device with a vision correction framework implemented on an image processing device and a wearable spectacles device, in accordance with one or more embodiments.

In some embodiments, with respect to FIG. 3, system 100 may include a vision system 300, which includes a vision correction framework 302. The vision correction framework 302 may be implemented on an image processing device 304 and a spectacles device 306 for placing on a subject. The image processing device 304 may be contained entirely in an external image processing device or other computer, while in other examples all or part of the image processing device 304 may be implemented within the spectacles device 306.

The image processing device 304 may include a memory 308 storing instructions 310 for executing the testing or visioning modes described herein, which may include instructions for collecting high-resolution images of a subject from the spectacles device 306. In the visioning mode, the spectacles device 306 may capture real-time visual field image data as raw data, processed data, or pre-processed data. In the testing mode, the spectacles device may project testing images (such as the letters "text," images of a vehicle or other object, or other stimuli) for testing aspects of a visual field of a subject.

The spectacles device 306 may be communicatively connected to the image processing device 304 through a wired or wireless link. The link may be through a Universal Serial Bus (USB), IEEE 1394 (Firewire), Ethernet, or other wired communication protocol device. The wireless connection can be through any suitable wireless communication protocol, such as, WiFi, NFC, iBeacon, Bluetooth, Bluetooth low energy, etc.

In various embodiments, the image processing device 304 may have a controller operatively connected to a database via a link connected to an input/output (I/O) circuit. Additional databases may be linked to the controller in a known manner. The controller includes a program memory, the processor (may be called a microcontroller or a microprocessor), a random-access memory (RAM), and the input/output (I/O) circuit, all of which may be interconnected via an address/data bus. It should be appreciated that although only one microprocessor is described, the controller may include multiple microprocessors. Similarly, the memory of the controller may include multiple RAMs and multiple program memories. The RAM(s) and the program memories may be implemented as semiconductor memories, magnetically readable memories, or optically readable memories. The link may operatively connect the controller to the capture device, through the I/O circuit.

The program memory or the RAM may store various applications (i.e., machine readable instructions) for execution by the microprocessor. For example, an operating system may generally control the operation of the vision system 300 such as operations of the spectacles device 306 or image processing device 304 and, in some embodiments, may provide a user interface to the device to implement the processes described herein. The program memory or the RAM may also store a variety of subroutines for accessing specific functions of the image processing device 304 described herein. By way of example, and without limitation, the subroutines may include, among other things: providing a stimulus to be presented for display on one or more displays or lenses of a spectacles device to a subject, and obtaining, from a spectacles device, feedback related to one or more eyes of the user (e.g., eye movement, eye gaze, changes in eye movement, changes in eye gaze, pupil size, pupil size changes, or other eye related characteristics).

In addition to the foregoing, the image processing device 304 may include other hardware resources. The device may also include various types of input/output hardware such as a visual display and input device(s) (e.g., keypad, keyboard, etc.). In an embodiment, the display is touch-sensitive, and may cooperate with a software keyboard routine as one of the software routines to accept user input. It may be advantageous for the image processing device 304 to communicate with a broader network (not shown) through any of a number of known networking devices and techniques (e.g., through a computer network such as an intranet, the Internet, etc.). For example, the device may be connected to a database of aberration data.

In some embodiments, system 100 may store prediction models, visual defect information (e.g., indicating detected visual defects of a user), feedback information (e.g., feedback related to stimuli displayed to users or other feedback), or other information at one or more remote databases (e.g., in the cloud). In some embodiments, the feedback information, the visual defect information, or other information associated with multiple users (e.g., two or more users, ten or more users, a hundred or more users, a thousand or more users, a million or more users, or other number of users) may be used to train one or more prediction models. In some embodiments, one or more prediction models may be trained or configured for a user or a type of device (e.g., a device of a particular brand, a device of a particular brand and model, a device having a certain set of features, etc.) and may be stored in association with the user or the device type. As an example, instances of a prediction model associated with the user or the device type may be stored locally (e.g., at a wearable device of the user or other user device) and remotely (e.g., in the cloud), and such instances of the prediction model may be automatically or manually synced across one or more user devices and the cloud to enable the user to have access to the latest configuration of the prediction model across any of the user devices or the cloud.

In some embodiments, a user profile may be associated with the user or the device type. For example, by having a user profile being associated with the user, the device (e.g., a spectacles device) may be configured to automatically adjust the displays of the device based on the user profile of the user. In this way, multiple users can wear the same device (or different devices) and the device may automatically adjust the displays of the device based on the user profile of the user. As another example, due to different devices (e.g., different spectacles devices) having different characteristics in the way that they are constructed (e.g., display sizes, distances between the displays of the device, mechanisms that cause the displays to adjust, etc.), different devices may require different parameters to adjust such displays for a user. In one use case, a first device may have smaller displays that require the displays to be adjusted a further distance a part (based on a user profile) than a second device (e.g., a device with larger displays). To mitigate these differences, having user profile associated with the device type may allow for these differences to be reconciled and the displays of a particular device may be adjusted based on the user profile or the type of device.

Subsystems 112-124

In some embodiments, with respect to FIG. 1A, testing subsystem 122 may provide a visual test presentation to a user. As an example, the presentation may include a set of stimuli. During the presentation (or after the presentation), testing subsystem 122 may obtain feedback related to the set of stimuli (e.g., feedback indicating eye movement of one or more eyes of the user, feedback indicating gaze direction of one or more eyes of the user, feedback indicating whether or how the user sees one or more stimuli of the set). As an example, the feedback may include an indication of a response of the user to one or more stimuli (of the set of stimuli) or an indication of a lack of response of the user to such stimuli. The response (or lack thereof) may relate to an eye movement, a change in eye movement, a gaze direction, a change in gaze direction, a pupil size, a pupil size change, or a user modification of one or more stimuli or other user input (e.g., the user's reaction or other response to the stimuli). As another example, the feedback may include an eye image captured during the visual test presentation or other eye movement/gaze direction information (e.g., via one or more eye tracking sensors). The eye image may be an image of the pupil of the eye (e.g., the overall pupil or a portion thereof), image of a retina of the eye (e.g., the overall retina or a portion thereof), an image of a cornea of the eye (e.g., the overall cornea or a portion thereof), or other eye image and one or more eye images may be used to determine eye movement of one or more eyes of the user.

In some embodiments, testing subsystem 122 may determine whether a movement of one or more eyes of the user satisfies a movement amount threshold, and, in response to the eyes of the user satisfying a movement amount threshold, testing subsystem 122 may generate a user profile that includes one or more pupil-related characteristics associated with the user (e.g., based on the determination or the feedback). In some embodiments, the movement amount threshold may be satisfied based on the eyes of the user exceeding a movement amount threshold. For example, the movement of the eyes of the user may be greater than the movement amount threshold. In some embodiments, the movement amount threshold may be satisfied based on the eyes of the user meeting a movement amount threshold. For example, the movement of the eyes of the user may be equal to (or greater than) the movement amount threshold. In some embodiments, the movement amount threshold may be a range, and the movement amount threshold may be satisfied if the movement of one or more eyes of the user is within such range. Alternatively, the movement amount threshold may be satisfied (when the movement amount threshold is a range) if the movement of one or more eyes of the user falls outside of the movement amount threshold range. Based on the movement of the eyes of the user satisfying the movement amount threshold, testing subsystem 122 may generate a user profile that includes one or more pupil-related characteristics associated with the user. For example, the pupil-related characteristics may include the pupil distance between the pupils of a user, one or more pupil sizes of the pupils of the user, one or more curvatures of the pupils of the user, or other pupil-related characteristics of the user. In some embodiments, testing subsystem 122 may facilitate an adjustment/correction of the spectacle device's lenses or displays based on the pupil-related characteristics of the user.

The eye tracking functionalities described herein may include pupil physical condition or location (e.g., visual axis, pupil size, or limbus), alignment, dilation, or line of sight. Line of sight, also known as the visual axis, is a goal that can be achieved by one or more of tracking the pupil, the limbus (which is the edge between the cornea and the sclera), or even track blood vessel on the surface of the eye or inside the eye. Thus, eye tracking may similarly include limbus or blood vessel tracking. The eye tracking may be performed utilizing one or more inward facing image sensors as described herein. In various embodiments, eye tracking functionalities may be used for determination of one or more pupil-related characteristics. For example, the pupil tracking functionalities may be used for tracking the movement of one or more eyes of the user, gaze directions of one or more eyes of the user, a pupil size change, a change in gaze directions, or other changes. Testing subsystem 122 may determine, based on the movement of one or more eyes of the user, one or more pupil-related characteristics of the user. For example, the pupil-related characteristics may include a pupil distance between the pupils of the user, one or more pupil sizes of the pupils of the user, one or more curvatures of the pupils of the user, or other pupil characteristics of the pupils of the users. In some embodiments, testing subsystem 122 may determine the pupil distance of a user based on the movement of (i) only one eye of the user, (ii) both eyes of the user, (iii) the gaze direction of only one eye of the user, (iv) gaze directions of both eyes of the user, or (v) other feedback obtained during testing (e.g., other eye characteristics).

In some embodiments, stimuli may be presented to the user during one or more vision tests. For example, testing subsystem 122 may generate for display one or more stimuli for each eye of the user to be presented on one or more display portions of spectacles device 170. The set of stimuli displayed to the user may include stimuli of different brightness, contrast, saturation, or sharpness levels, locations, and the responses or lack of responses to a stimulus having a particular brightness, contrast, saturation, or sharpness level, or location may provide an indication of whether a portion of the user's visual field (corresponding to the location of the displayed stimuli) has an issue related to eye movement, gaze direction, brightness, contrast, saturation, or sharpness. As an example, if an eye of the user responds to a displayed stimulus (e.g., the eye moves to fixate on the stimulus), the eye's response may be used as an indication that the eye can see the displayed stimulus. On the other hand, if an eye of the user does not respond to a stimulus (e.g., the eye does not move to fixate on the stimulus), the eye's lack of response may be used as an indication that the eye cannot see the displayed stimulus.

In some embodiments, a first stimulus may be presented on a first display for a first eye of the user at a location of the first display. This may cause an eye of the user (e.g., the eye corresponding to the presentation of the first stimulus on the first display) to fixate on the location of the first stimulus on the first display. A second stimulus may be presented on a second display for a second eye of the user (e.g., the other eye of the user) at the location of the second display at a time subsequent to the presentation of the first stimulus on the first display. In some embodiments, the second stimulus may be presented when the first stimulus is no longer being presented. This may cause the other eye of the user (e.g., the eye corresponding to the presentation of the second stimulus on the second display) to fixate on the location of the second stimulus of the second display. During (or subsequent to) the vision test, one or more eye tracking sensors (e.g., inward directed sensors 184) may track the movement of the eye's (e.g., the responses or other feedback) of the user to determine whether the eyes of the user move in connection with the presentation of the respective stimuli for each eye of the user. For example, when the second stimulus is presented to the other eye of the user (e.g., the second eye), the eye tracking sensors may track the movement of the other eye of the user, and testing subsystem 122 may determine if the other eye's movement satisfies a threshold movement amount (e.g., moved more than a threshold amount) to fixate on the location of the second stimulus. For instance, as previously described, because the user's eye (e.g., the first eye) is already fixated at the location of the first display, when the second stimulus is presented for the user's other eye (subsequent to the presentation of the first stimulus), this may cause the other eye of the user to move to fixate on the location of the second stimuli on the second display. Based on the other eye satisfying a threshold movement amount (e.g., moving more than a threshold amount), testing subsystem 122 may determine one or more pupil-related characteristics of the user. For example, the pupil-related characteristics of the user may include the pupil distance between the pupils of a user, and the pupil distance may be determined based on the determination (e.g., that the other eye of the user exceeded a threshold movement amount) and the movement of the other eye (e.g., the amount of movement of the other eye). Additionally or alternatively, testing subsystem 122 may generate a user profile that includes the pupil distance of the user (e.g., a pupil-related characteristic). The determined pupil distance of the user may be used to modify, adjust, or correct the distance between one or more displays of spectacles device 170 or generate/update a user profile of the user. In this way, for example, the wearable device may automatically improve the user experience by mitigating eye strain, headaches, blurry vision, distorted vision, or other eye-related issues, such as those related to the positioning or shape of displays that are not appropriate for the user In some embodiments, a location of a fixation point and locations of the stimuli to be displayed to the user may be dynamically determined based on the responses (or lack of responses) of the user's eyes, the movement of one or more of the user's eyes, gaze direction of one or more eyes of the user, or other aspect of the user's eyes. As an example, during a visual test presentation, both the fixation points (e.g., the locations of the stimuli) may be presented at central locations of respective display pieces (e.g., a right and left display of a wearable device). However, based on one or more defective field portions of a user (e.g., determined by eye movement of the user during one or more visual test presentations, a response of the user's eyes in connection with the presentation of the stimuli (or the lack thereof), or other feedback), the stimuli may currently be at a location of the display that an eye of the user may not be able to see. As such, testing subsystem 122 may adjust/select a fixation point that is outside of the user's defective visual field portions to allow a user to see or respond to a presented stimulus.

As discussed, in some embodiments, testing subsystem 122 may adjust/select a fixation point (e.g., for the location of one or more stimuli during a visual presentation test) based on eye movement of one or more eyes of the user (e.g., the movement of only one eye of the user, the movement of one or more eyes of the user, the gaze direction of only one eye of the user, the gaze directions of one or more eyes of the user, or other eye movement, such as those occurring during the visual test presentation). In one use case, testing subsystem 122 may cause a first stimulus to be displayed at a first location on a user interface (e.g., of a wearable device or other device of the user) based on the fixation point. Testing subsystem 122 may adjust/select the fixation point based on the eye movement information and cause a second stimulus to be displayed at a second location on the user interface during the visual test presentation based on the adjusted fixation point. Testing subsystem 122 may obtain feedback information during the visual test presentation and generate visual defect information based on such feedback information. As an example, the feedback information may indicate feedback related to the first stimulus, feedback related to the second stimulus, or feedback related to one or more other stimulus. Such feedback may indicate (i) a response of the user to a stimulus, (ii) a lack of response of the user to a stimulus, (iii) whether or an extent to which the user senses one or more stimuli, an extent of light sensitivity, distortion, or other aberration, or (iv) other feedback. The generated visual defect information may be used to (i) train one or more prediction models, (ii) determine one or more user profiles for the user, (iii) facilitate live image processing to correct or modify images for the user, (iv) select one or more locations of stimuli, (v) or perform other operations described herein.

In some embodiments, the eye tracking system may continuously acquire gaze coordinates (e.g., on a periodic basis, in accordance with a schedule, or other automated triggers). A coordinates transformation may be performed to convert the eye movements spherical coordinates (θ, φ) into the display's Cartesian coordinates (x, y). As such, the device's controller may determine the central position of the stimuli to be displayed. In some cases, low pass filtering may be performed on the gaze data to remove micro-eye movements (e.g., micro-eye movements caused by incessantly moving and drafting that occur even at fixations because the eyes are never completely stationary) that may otherwise cause shaky stimuli to be displayed to the user.

In some embodiments, testing subsystem 122 may monitor one or more eye-related characteristics related to eyes of a user during visual test presentation via two or more user interfaces (e.g., on two or more displays) and determine one or more pupil-related characteristics based on the eye-related characteristics occurring during the visual test presentation. For example, the pupil-related characteristics of a user may include a pupil distance between pupils of the user, one or more pupil sizes of one or more pupils of the user, one or more curvatures of the pupils of the user, or other pupil characteristics of the pupils of the user. With respect to pupil distance, to determine a user's pupil distance, the distance between the centers of the user's pupils are measured. However, in cases where the user has one or more crossed eyes, determining the user's pupil distance is not so straight forward. When the user's eyes are crossed, it may be difficult to obtain an accurate measurement of the user's pupil distance because the crossed eyes result in a different gaze direction for each eye. To overcome this technical challenge, testing subsystem 122 may determine a deviation measurement (e.g., a difference in eye movement for each eye of the user, a difference in eye gaze for each eye of the user, etc.) to correct pupil distance measurement errors. For example, in some embodiments, a deviation measurement for the eye may be determined based on the eye-related characteristics (indicated by the monitoring as occurring upon the stimuli presentation) and used to determine one or more pupil-related characteristics of the user and provide an increased user experience (e.g., by mitigating eye/vision related issues) by adjusting the displays of a wearable device. As an example, the deviation measurement may indicate a deviation of the eye relative to the other eye, and the deviation measurement may be used to determine and correct errors when determining a user's pupil distance.

As another example, the deviation measurement may also indicate one or more gaze directions of one or more eyes of the user. For example, by determining the amount of deviation, testing subsystem 122 may determine that the gaze directions of one or more eyes of the user are consistent with one another. For instance, testing subsystem 122 may determine based on the monitored eye-related characteristics that the amount of deviation measured in one eye with respect to another satisfies a deviation measurement threshold value. For example, in some embodiments, the deviation measurement threshold value may be satisfied when the amount of deviation measured in one eye with respect to another eye is within a deviation measurement threshold value range (e.g., 1 degree, 2 degrees, 3 degrees, 1 millimeter, 2 millimeters, 3 millimeters, etc.). For example, if one eye of the user deviates from another eye of the user within a range of 2-3 degrees, then testing subsystem 122 may determine that the gaze directions of the user's eyes are consistent with one another. In some embodiments, the deviation measurement threshold value may be satisfied when the amount of deviation measured in one eye with respect to another eye is less than a deviation measurement threshold value. For example, if one eye of the user deviates from another eye of the user less than 2 degrees, then testing subsystem 122 may determine that the gaze directions of the user's eyes are consistent with one another. However, in some embodiments, where testing subsystem 122 determines that the gaze directions of the user's eyes are inconsistent with one another, testing subsystem 122 may be configured to confirm the deviation measurements (e.g., by performing one or more additional visual test presentations as explained herein). In some embodiments, in response to determining that the eye gaze directions are consistent with one another, the pupil distance of the user may be determined. For instance, the pupil distance of the user may be determined based on the consistency determination and the locations of the first and second stimuli (e.g., the stimuli presented during the visual test presentation). In other embodiments, the pupil distance of the user may be determined based on the locations of the first and second stimuli, and the distance between the displays of the wearable device. However, in some embodiments, in response to determining that the eye gaze directions are inconsistent with one another, the pupil distance of the user may also be determined based on the (i) the respective locations of the stimuli on the displays, (ii) the distance between the displays of the wearable device, and (iii) the deviation measurement of the eye gaze.

In some embodiments, testing subsystem 122 may determine a deviation measurement or other visual defect information for a first eye of a user by (i) causing a stimulus to be presented at a given time at the corresponding location on a first user interface for the first eye and at the corresponding location on a second user interface for the second eye and (ii) determining the visual defect information based on one or more eye-related characteristics of the first eye occurring upon the stimulus presentation. As an example, the stimulus may be presented at the central location on both user interfaces or at another corresponding location on both user interfaces (e.g., a location that corresponds to another location with respect to both user interfaces, a location that is the same on one user interface as the second user interface, etc.). In one use case, when presenting a stimulus in front of both eyes (e.g., FIG. 4B), the dominant eye (e.g., the left eye in FIG. 4B) will instinctively move to the corresponding position and fixate on the stimulus (e.g., within less than a second). Although the other eye (e.g., the right eye in FIG. 4B) will also move, it will not instinctively fixate on the stimulus because the other eye is crossed out, thereby causing the user to see double. For example, while the other eye will instinctively move, the instinctive movement will result in the other eye's gaze direction being toward a different position. However, when the user focuses on looking at the stimulus with the user's other eye, the other eye will move and fixate on the stimulus presented at the corresponding location on the other eye's user interface. Because the stimulus is presented at the corresponding position on both user interfaces, the dominant eye will remain dominant and continue to fixate on the stimulus presented at the corresponding location on the dominant eye's user interface. Testing subsystem 122 may measure the correction movement of the other eye (and other changes in the eye-related characteristics of the other eye) to determine the deviation measurement for the other eye (e.g., the amount of movement of the other eye may correspond to the amount of the crossing of the other eye).

In some embodiments, after obtaining a deviation measurement or other visual defect information for a first eye of a user by measuring changes in the eye-related characteristics of the first eye (e.g., the movement of the first eye occurring upon the presentation of a stimulus at a corresponding location on a first user interface for the first eye), testing subsystem 122 may cause a stimulus to be presented at a modified location on the first user interface for the first eye display. As an example, the stimulus presentation at the modified location occurs while a stimulus is not presented on a second user interface for the second eye (or at least while a stimuli intensity of the second user interface does not satisfy a stimuli intensity threshold to prevent the second eye from reacting to any stimuli on the second user interface). Based on one or more eye-related characteristics of the first eye or the second eye not changing beyond a change threshold upon the presentation at the modified position, testing subsystem 122 may confirm the deviation measurement or other visual defect information for the first eye. As an example, the deviation measurement for the first eye may be confirmed based on the first eye not moving beyond a movement threshold (e.g., no movement or other movement threshold) upon the presentation of a stimulus at the modified position. Additionally, or alternatively, the deviation measurement for the first eye may be confirmed based on the second eye not moving beyond the movement threshold. In this way, the deviation measurement for the eyes of the user may be confirmed which may indicate that the displays of the wearable device are properly adjusted for the user.

In some embodiments, testing subsystem 122 may generate one or more user profiles associated with a user based on one or more deviation measurements or other visual defect information for one or more eyes of the user (e.g., that are obtained via one or more visual test presentations). As an example, each of the user profiles may include parameters or functions used determine the pupil distance of the user or adjust/correct the distance between one or more lenses or displays of a wearable device.

In some embodiments, one or more visual tests may be performed to determine whether a deviation of an eye of a user exists, to measure a deviation of an eye of the user, to obtain feedback related to one or more eye characteristics, generate one or more user profiles based on eye related characteristics, measure the pupil distance of a user, or adjust the lenses/displays of a wearable device. In some embodiments, the same visual test may be repeated to confirm results obtained by the system. In other embodiments, different visual tests may be performed based on one or more previous test results (e.g., based on feedback obtained from a prior test). As referred to herein, "position" and "location" may be used interchangeably. Additionally, although the following paragraphs may refer to objects, distances, stimuli, or other items as "first" and "second," it should be noted that the terms "first" and "second" may indicate a different item, the same items, an order of the items, or other indication and one of ordinary skill in the art would appreciate the context in which these terms are used to be interpreted as non-limiting.

Figure 4A:
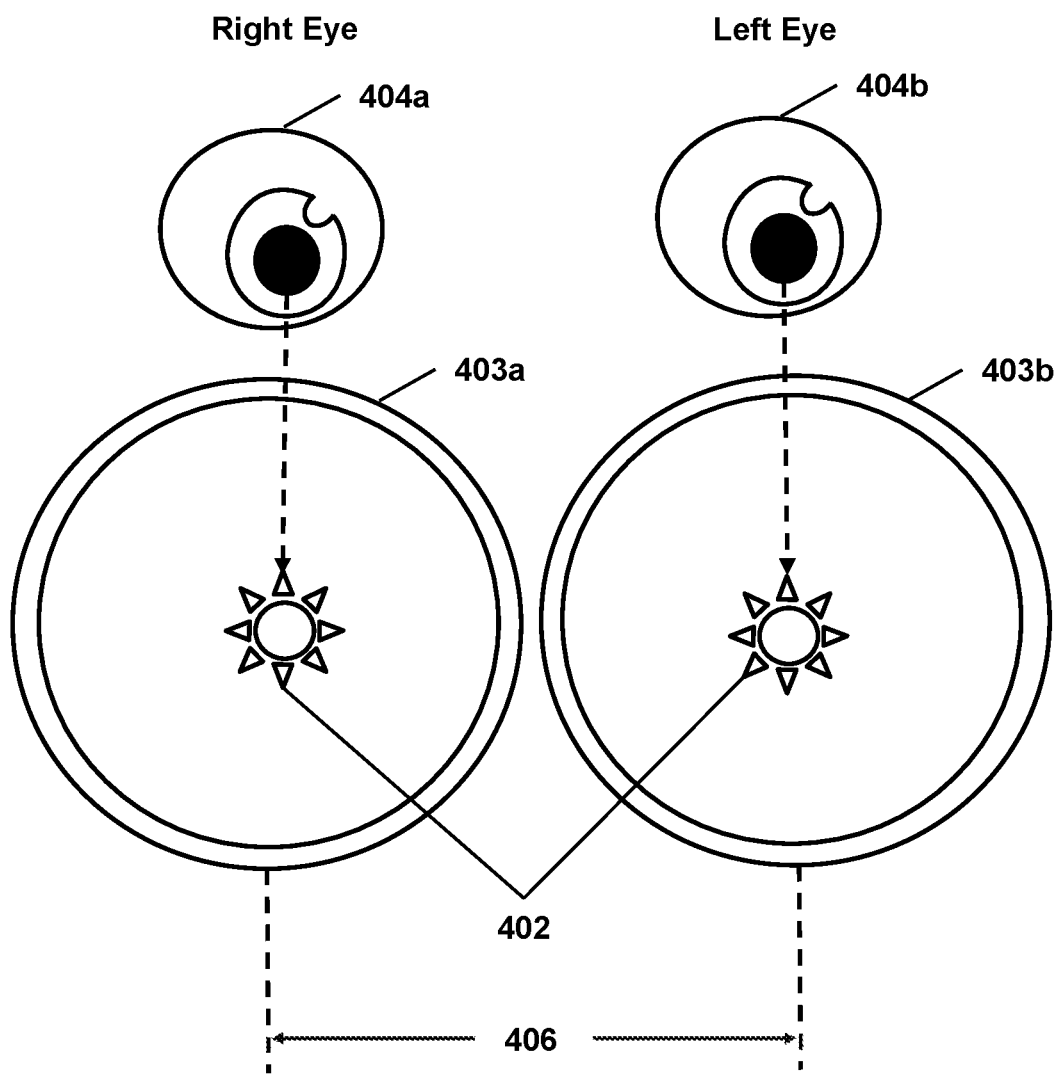
FIG. 4A illustrates a use case of a visual test presentation being displayed to a patient without crossed eyes, in accordance with one or more embodiments.

In one use case, with respect to FIG. 4A, when the stimulus 402 is presented at the central position on right and left displays 403a and 403b of a wearable device to a patient (e.g., patient with no crossed eyes) and the distance between the displays are correct (e.g., based pupil-related characteristics of the user), both eyes (e.g., right and left eyes 404a and 404b) will instinctively move and fixate on the stimulus 402 at the central position on each wearable display, and, thus, the patient only sees one stimulus 402. Additionally, as shown in FIG. 4A, the gaze directions of the user are also consistent with one another (e.g., the line of sight of each eye of the user 404a and 404b do not deviate with respect to each other). As such, based on the foregoing eye responses, testing subsystem 122 may determine that the user does not have double vision.

In another use case, because the wearable device has two displays (e.g., right and left displays 403a and 403b), the distance between the displays (e.g., display distance 406) may be a generic distance that is not currently set for the current user (e.g., not set for the user's pupil distance). This may cause the user to see two stimuli (e.g., stimuli 402), and may, further cause the user to experience eye strain, fatigue, blurred vision, distorted vision, headaches, or other eye/vision related issues. As such, based on the foregoing eye responses, testing subsystem 122 may determine that the user has double vision and may experience one of the foregoing eye/vision related issues. However, by determining the user's correct pupil distance or adjusting display distance 406 based on the user's pupil distance, the eye/vision related issues may be mitigated. Additionally or alternatively, visioning subsystem 124 may generate a user profile that includes the user's correct pupillary distance. In this way, the user profile may be used to perform future adjustments of the wearable device's displays (e.g., where the wearable device may be worn by multiple users) or provided to one or more service providers to customize lenses or frames for the user.

For example, with respect to FIG. 4A, if only one stimulus for one eye of the user is presented (e.g., for the left eye 404b) at a first time to the user, the left eye 404b with be caused to fixate on the stimulus 402 on the left display 403b. When another stimulus 402 is only presented for right eye 404a at a time subsequent to the first time, and the stimulus that was presented for the left eye 404b is no longer visible to the user (e.g., when the stimulus that was presented for the left eye 404b is not presented, at a stimulus intensity threshold to the extent the left eye 404b cannot see it, etc.), then the right eye 404a will not move (as the user does not have crossed eyes), and testing subsystem 122 may determine that there is not an eye movement that exceeds an eye movement threshold amount. Based on the eyes of the user not exceeding a threshold amount, testing subsystem 122 may determine the user's pupil distance based on the locations of stimuli 402 with respect to each of the left and right display portions 403b, 403a and the distance between the left and right display portions (e.g., display distance 406). In some embodiments, a user profile may be generated by visioning subsystem 124 that includes the user's determined pupil distance.

Figure 4B:
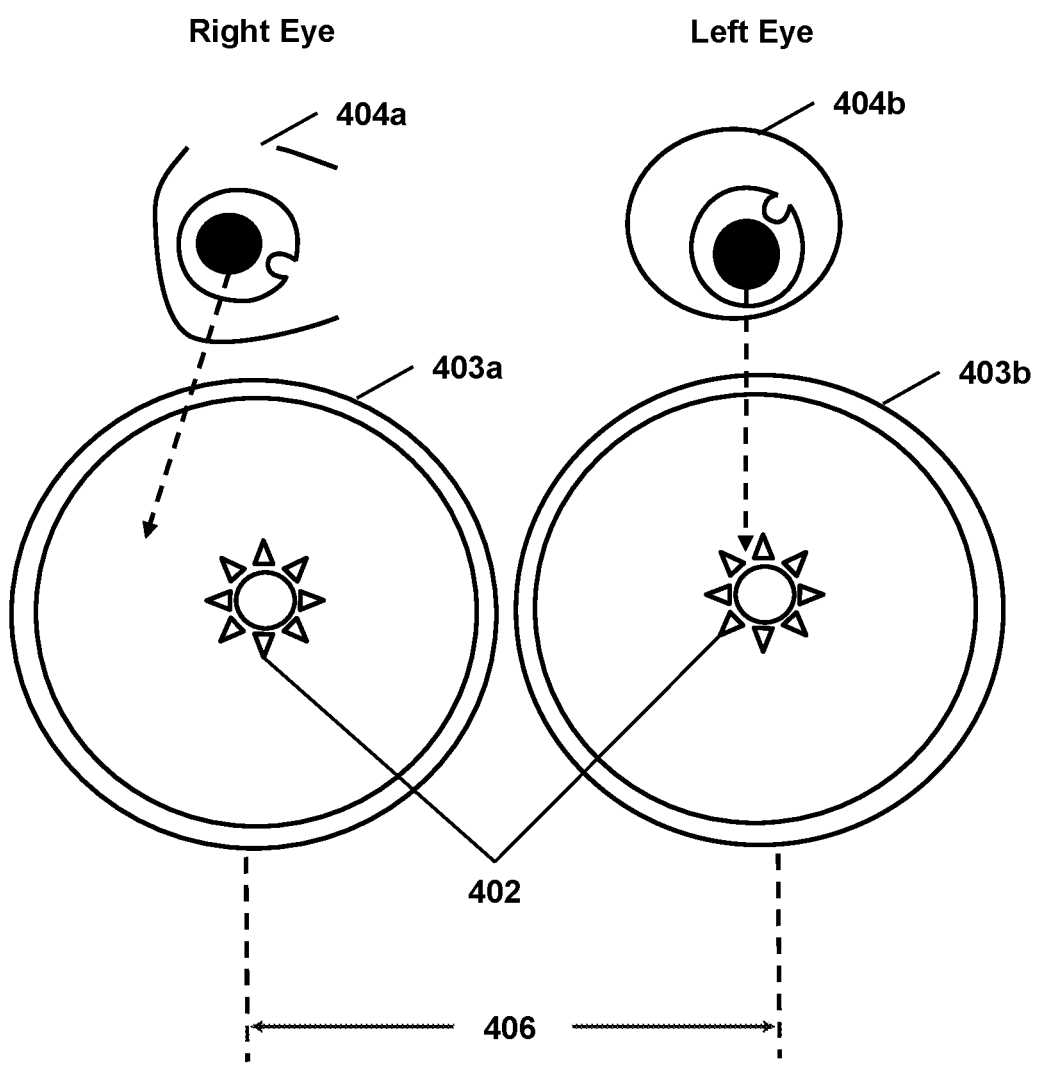
FIG. 4B illustrates a use case of a visual test presentation being displayed to a patient with crossed eyes, in accordance with one or more embodiments.

In another use case, with respect to FIG. 4B, when the stimulus 402 is presented at the central position on right and left displays of a wearable device to a patient with crossed eyes, one of the eyes (e.g., the dominant eye) will instinctively move to the central position and fixate on the stimulus 402 (e.g., the left eye 404b instinctively fixated on the stimulus 402). Although the other eye (e.g., the right eye 404a) will also move, it does not fixate on the stimulus 402 because the other eye is crossed out, thereby causing the user to see double (e.g., the user sees two stimuli instead of one). For example, while the other eye will instinctively move, the instinctive movement will result in the other eye's gaze direction being toward a different position. Based on the foregoing eye responses, testing subsystem 122 may determine that the user has double vision. However, in a further use case, when the user focuses on looking at the stimulus 402 with the user's other eye (e.g., the crossed right eye 404a), the other eye will move and fixate on the stimulus 402 presented at the central position on the other eye's user interface. Because the stimulus 402 is presented at the central position on both displays 403a and 403b, the dominant eye will remain dominant and continue to fixate on the stimulus 402 presented at the central position on the dominant eye's display. The correction movement of the other eye (and other changes in the eye-related characteristics of the other eye) may be measured to determine the deviation measurement for the other eye (e.g., the amount of movement of the other eye may correspond to the amount of the crossing of the other eye). Based on the deviation measurement for the other eye exceeding a threshold movement amount, testing subsystem 122 may determine the user's pupil distance. In some embodiments, the wearable device may adjust/update display distance 406 based on the determined pupil distance. Additionally or alternatively, based on the deviation measurement for the other eye and display distance 406, visioning subsystem 124 may determine the user's pupil distance to adjust display distance 406. In this way, for example, the user's experience may be improved by the adjustment of the wearable device based on the user's pupil distance by mitigating eye strain, headaches, blurry vision, double vision, distorted vision or other eye-related issues, such as those related to the positioning of displays that are not appropriate for the user.

In some cases, testing subsystem 122 may generate, retrieve from storage, or be configured to present one or more visual tests to the user to measure the user's pupil distance. To accurately determine the user's pupil distance or to verify that the user may or may not see double, the stimuli presented to the user on the respective displays of a wearable device may be presented at different times (e.g., t1, t2, t3, t4, etc.). In this way, one or more eye tracking sensors may be able to more accurately determine one or more eye characteristics (e.g., eye movement, gaze directions, pupil size changes, etc.) of the user in connection with the stimulus presentations at such presentation times.

Figure 4C:
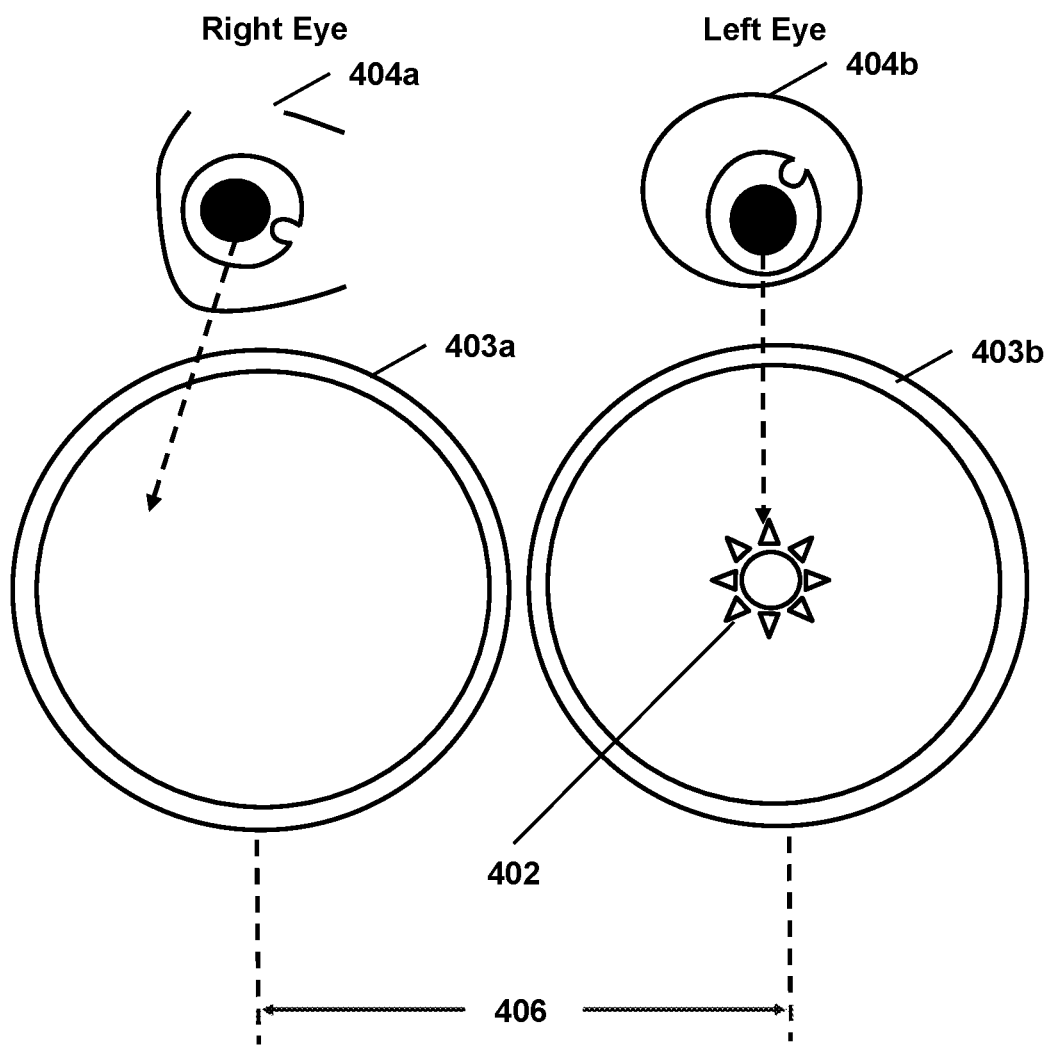
FIGS. 4C-4K illustrate automated pupil distance detection or spectacles correction/adjustment based thereon, in accordance with one or more embodiments.

For example, with respect to FIG. 4C, at time t1, a stimulus (e.g., the stimulus 402) may be presented at a location only to the left eye 404b by presenting the stimulus on the left display 403b and not presenting a stimulus on the right display 403a. If, for example, a stimulus was presented at the position to both eyes 404a and 404b as shown in FIG. 4B immediately prior to the stimulus presentation to only the left eye 404b (e.g., at time t0 immediately prior to the stimulus presentation at time t1), then the left eye 404b will not move because the left eye 404b is already fixated on the central position. If, however, the left eye 404b is not already fixated on the central position, the stimulus presentation to only the left 404b will cause the left eye 404b to instinctively move to the location of the stimulus and fixate on the stimulus 402. In some embodiments, the location may be a central position of the display. In other embodiments, based on one or more defective vision fields detected by the system, testing subsystem 122 may adjust/select the location of the stimulus to be at a different position (e.g., moved to the right or left, up or down) to the extent the user may see the stimulus 402.

Additionally or alternatively, when the stimulus (e.g., stimulus 402) is being presented during time t1 to the left eye 404b on the left display, a stimulus may also be presented to the right eye 404a to the extent the stimuli intensity of the stimuli being presented to the right eye 404a does not satisfy a stimuli intensity threshold. For example, as shown in FIG. 4C, stimulus 402 being presented to the left eye 404b may satisfy a stimuli intensity threshold to the extent that the user may see the stimuli. However, a stimulus may also be presented to the right eye 404a at the same time, but the stimulus being presented to the right eye 404a may not satisfy a stimuli intensity threshold. For example, a stimuli intensity threshold may be a threshold level of brightness (e.g., as measured in nits or other metric). In some embodiments, the stimuli intensity threshold may be satisfied if the stimuli intensity meets or exceeds the stimuli intensity threshold. In other embodiments, the stimuli intensity threshold may be satisfied if the stimuli intensity does not meet or exceed the stimuli intensity threshold. In some embodiments, where the stimuli intensity threshold is a range (e.g., 1000 nits to 1100 nits), the stimuli intensity threshold may be satisfied if the stimuli being presented is within the stimuli intensity threshold range. In other embodiments, where the stimuli intensity threshold is a range, the stimuli intensity threshold may be satisfied if the stimuli being presented is not within (e.g., falls outside) of the stimuli intensity threshold range.

Figure 4D:
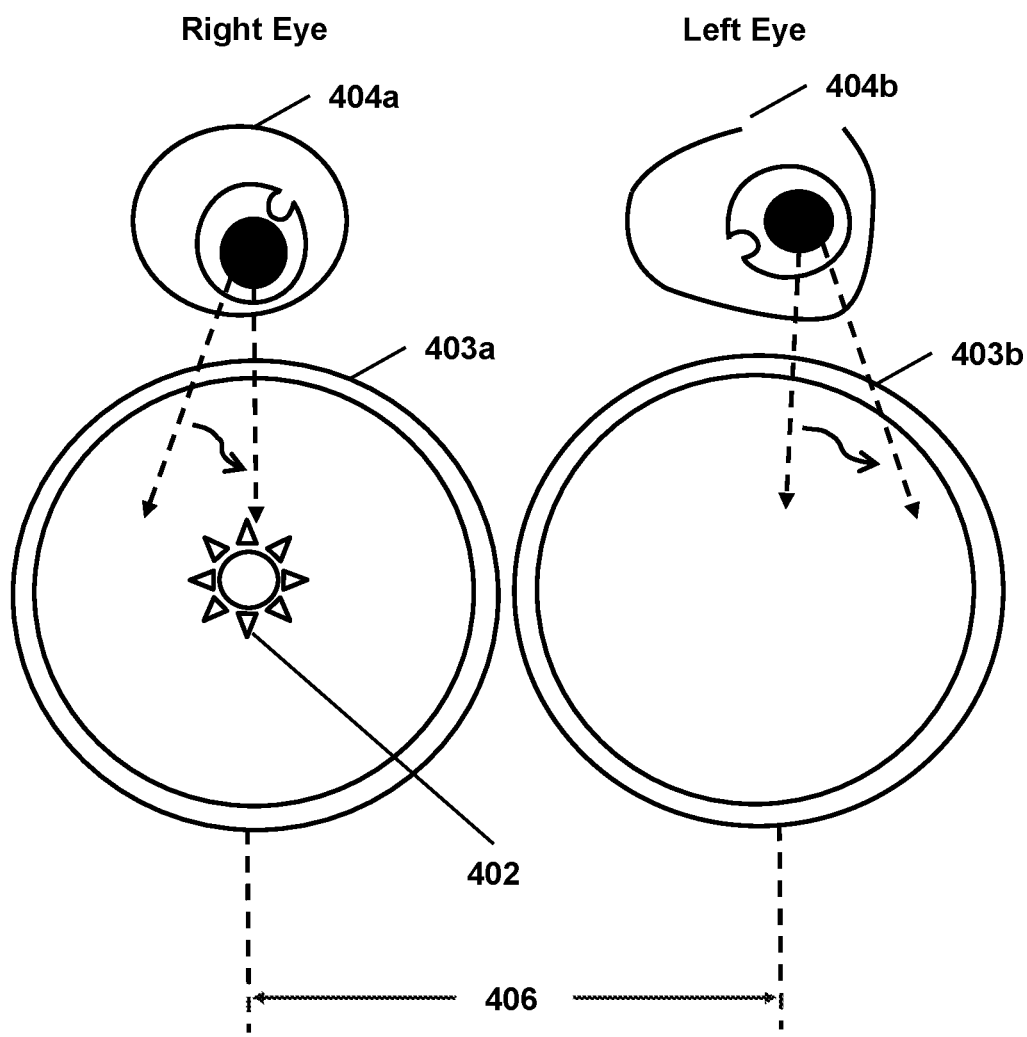

As indicated in FIG. 4D, a stimulus (e.g., the stimulus 402) may be presented at a location only to the right eye 404a (e.g., at time t2) by presenting the stimulus on the right display 403a and not presenting a stimulus on the left display 403b. In some embodiments, the stimulus being presented to the right eye 404a may occur subsequent to the presentation of the stimulus 402 on the left display 403b. In some embodiments, when the stimulus is being presented during time t2 to the right eye 404a on the right display, a stimulus may also be presented to the left eye 404b to the extent that the stimuli intensity of the stimuli being presented to the left eye 404b does not satisfy a stimuli intensity threshold (e.g., does not stimulate the left eye 404b). Because the left eye 404b is not being stimulated (e.g., has nothing to look at), the left eye 404b will lose dominance and thus move to the outside as a result of the right eye 404a taking over. Upon presenting the stimulus 402 only to the right eye 404a, the right eye 404a will instinctively take over and move to fixate on the location. Testing subsystem 122 may measure the movement of the right eye 404a to determine the deviation measurement for the right eye 404a (e.g., the amount of movement may correspond to the amount of the crossing of the right eye 404a). For example, the deviation measurement may be determined by obtaining feedback from one or more eye tracking sensors as previously described, and deviation measurements may be measured for each eye (e.g., right and left eye 404a, 404b) with respect to one or more visual tests. The feedback obtained from the eye tracking sensors may include one or more eye characteristics of the user's eyes (e.g., eye movement, eye gaze, pupil size, or other eye related characteristics).

In some embodiments, visioning subsystem 124 may compare the deviation measurement to a deviation threshold value (e.g., a threshold movement amount). The deviation threshold value may be that of an integer, floating point value, binary value, percentage, or other value indicating a metric of deviation of one or more eyes of the user. For example, the deviation measurement and the deviation threshold value may be measured in degrees, millimeters, inches, polar coordinate pairs, cartesian coordinate pairs, and the alike. The deviation threshold value may be a preset value based on a cohort of user data or patient data that indicates an acceptable amount of eye deviation (e.g., amount of eye movement, amount of gaze direction) for determining double vision, blurry vision, or other eye-related issues. The deviation threshold value may be stored in one or more storage devices on server 102, client device 104, or other database for retrieval.

In response to determining that the deviation measurement of the left or right eye 404b, 404a of the user exceeded the deviation threshold amount, visioning subsystem 124 may generate a user profile for the user that includes the user's pupil distance. In some cases, the deviation measurement of the left or right eye 404b, 404a may be associated (e.g., in connection with) the stimulus presentation at time t2, and the pupil distance of the user may be determined based on the deviation measurement of the left or right eye 404b, 404a.

The user's pupil distance may be determined in a variety of embodiments. For instance, visioning subsystem 124 may determine the user's pupil distance based on the movement of one or more eyes of the user. In some embodiments, visioning subsystem 124 may determine the user's pupil distance based on the deviation measurement of the left or right eye of the 404b, 404a of the user. In some embodiments, visioning subsystem 124 may determine the user's pupil distance based on the deviation measurement of only one eye of the user (e.g., only left eye 404b, only right eye 404a). In other embodiments, visioning subsystem 124 may determine the user's pupil distance based on the deviation measurement of both eyes of the user (e.g., left and right eye 404b, 404a). In some embodiments, visioning subsystem 124 may determine the user's pupil distance based on the locations of the respective stimuli being presented on right display or left display 403a, 403b in conjunction with the distance between the right and left displays 403a, 403b (e.g., display distance 406). Additionally, in some embodiments, the pupil distance of the user may be determined by feeding the eye movement (e.g., the deviation measurements) of the eyes of the user and the locations of the stimuli being presented to the user to a prediction model, where the prediction model may generate an output including one or more pupil-related characteristics of the user (e.g., the pupil distance of the user.).

Figure 4E:
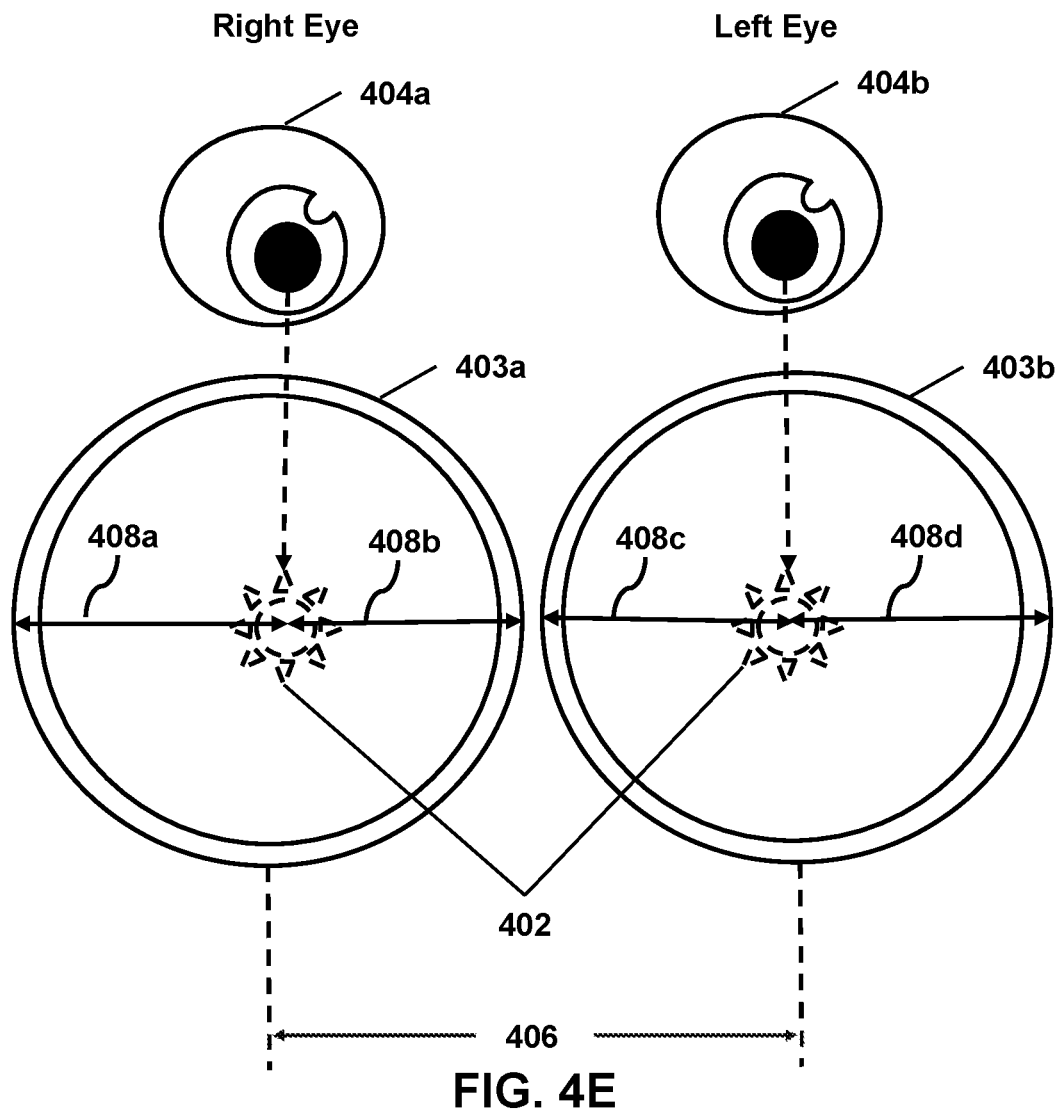

In some embodiments, in response to the deviation measurement of at least one eye of the user (e.g., right eye 404a, left eye 404b) exceeding the deviation threshold value, the pupil distance of the user may be determined by comparing the deviation measurement of one eye of the user (e.g., right eye 404a) to the other eye of the user (e.g., left eye 404b). For example, visioning subsystem 124 may compare the deviation measurement of each eye and may average the deviation measurements together. Based on the average of deviation measurements, the pupil distance may be calculated by either adding or subtracting the average deviation measurement to a preset distance (e.g., display distance 406). Because the distance between the displays of the wearable device (e.g., left and right displays 403b, 403a) is already known (e.g., as stored in one or more storage devices, servers, databases, onboard memory of the wearable device, etc.), the pupil distance of the user may be determined. Based on the determination of the pupil distance of the user, a user profile may be generated or updated to reflect the measured pupil distance of the user. Additionally or alternatively, the measured pupil distance of the user may be used to adjust/correct the distance between the displays of the wearable device. In this way, for example, the wearable device may automatically improve the user experience by mitigating eye strain, headaches, blurry vision, double vision, distorted vision, or other eye-related issues, such as those related to the positioning or shape of displays that are not appropriate for the user In some embodiments, the pupil distance of the user may be determined based on (i) a distance between the stimulus (e.g., stimulus 402) and an edge of the respective display (e.g., left or right display 403b, 403a) and (ii) the distance between each display of the wearable device (e.g., display distance 406). As indicated in FIG. 4E, stimuli 402 are presented at a location on the right display 403a and on the left display 403b. The presentation of such stimuli may be associated with a distance between the center of the stimulus (e.g., stimulus 402) and one or more edges of the display. For example, stimuli distances 408a-408d may represent the distances between the stimuli and an edge of the respective display. Although only stimuli distances 408a-408d are shown, it should be noted that any distance (either horizontal, vertical, on a diagonal, or the alike) may exists, and the horizontal stimuli distances 408a-408d are merely illustrative. Because testing subsystem 122 knows the location of the stimuli 402 with respect to each display and the size of each display, stimuli distances 408a-408d may easily be determined. Similarly, since the wearable device may be already set to a distance between the displays (e.g., display distance 406), display distance 406 may also be easily determined as it is already set. In a use case, where the eyes of the user did not move more than a deviation threshold amount (e.g., the user does not have double vision or is cross eyed), the pupil distance of the user may be determined based on (i) stimulus distance 408a or 408b, (ii) stimulus distance 408c or 408d, and (iii) display distance 406.

In some embodiments, a user profile may be generated. For example, based on feedback (e.g., eye movement, gaze directions, etc.) obtained during one or more visual tests, visioning subsystem 124 may generate a user profile for the user. The user profile may include information related to one or more pupil-related characteristics of the user (e.g., pupil distance between one or more pupils of the user, one or more pupil sizes of the pupils of a user, one or more curvatures of the pupils of the user, or other pupil characteristics of a user, etc.). In some embodiments, multiple user profiles may be generated in a way that each user profile is associated with one or more pupil-related characteristics. For example, a first user profile may be associated with pupil distance and a second user profile may be associated with eye movement of one or more eyes of the user. In this way, a plethora of information associated with the user may be stored in a way that the user profile(s) may be shared between other wearable devices, medical professionals, other users, or databases. For instance, the users' optometrist may be interested in such information obtained during the visual tests for creating customized eyeglasses for the user, updating one or more medical records of the user, or other use. In this way, by generating a user profile, the user profile may be shared and used by a variety of sources and may benefit medical professionals who treat the user by having detailed pupil-related characteristic information. Furthermore, the user profile(s) may be shared before an optometrist appointment for the user, and the optometrist may have a good indication of the user's eye health. This in return may speed up the time spent at such appointment and may help generate more accurate eye exam results thereby benefiting not only the user but also the optometrist.

Figure 4F:
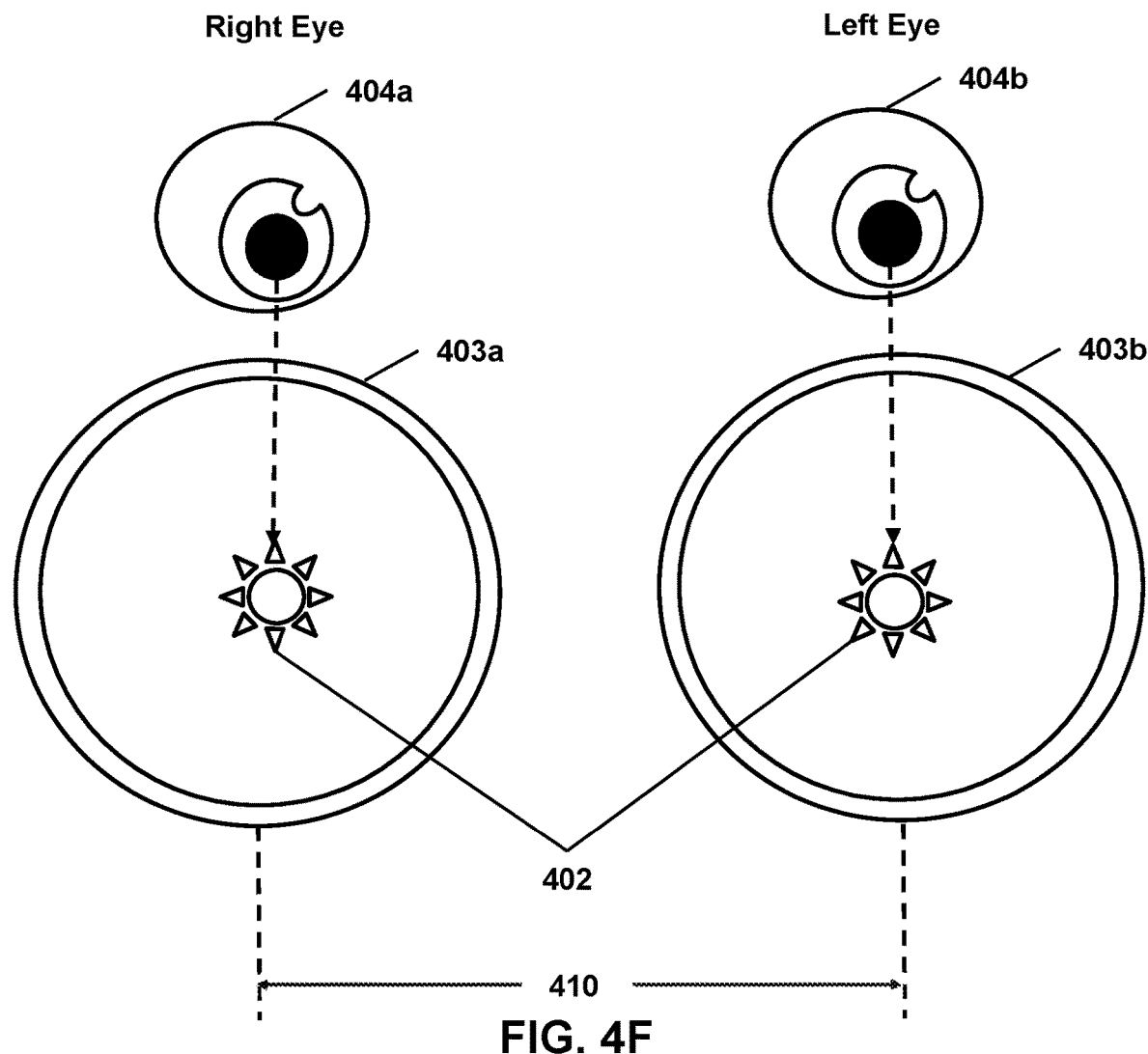

As shown in FIG. 4F, one or more positions of the left or right displays 403b, 403a may be adjusted based on the user profile (e.g., the pupil-related characteristics of the user). As an example, the display distance 406 may be updated, adjusted, or corrected to updated display distance 410 based on the determined pupil distance of the user. This in return causes the positions of the displays of the wearable device (e.g., left display 403b, right display 403a, etc.) to be adjusted. For example, as previously shown in FIG. 4E, display distance 406 was set to a first display distance. Upon determining the user's pupil distance, in order to provide relief of eye-related issues (e.g., eye strain, headaches, blurry vision, distorted vision, or other eye-related issues), the display distance 406 may be set, updated, adjusted, or otherwise corrected to a second display distance (e.g., updated display distance 410). Referring back to FIG. 4F, although updated display distance 410 appears to be a larger distance, it should be noted that updated display distance 410 is merely illustrative and based on the determined pupil distance, may in fact be a shorter distance.

Figure 4G:
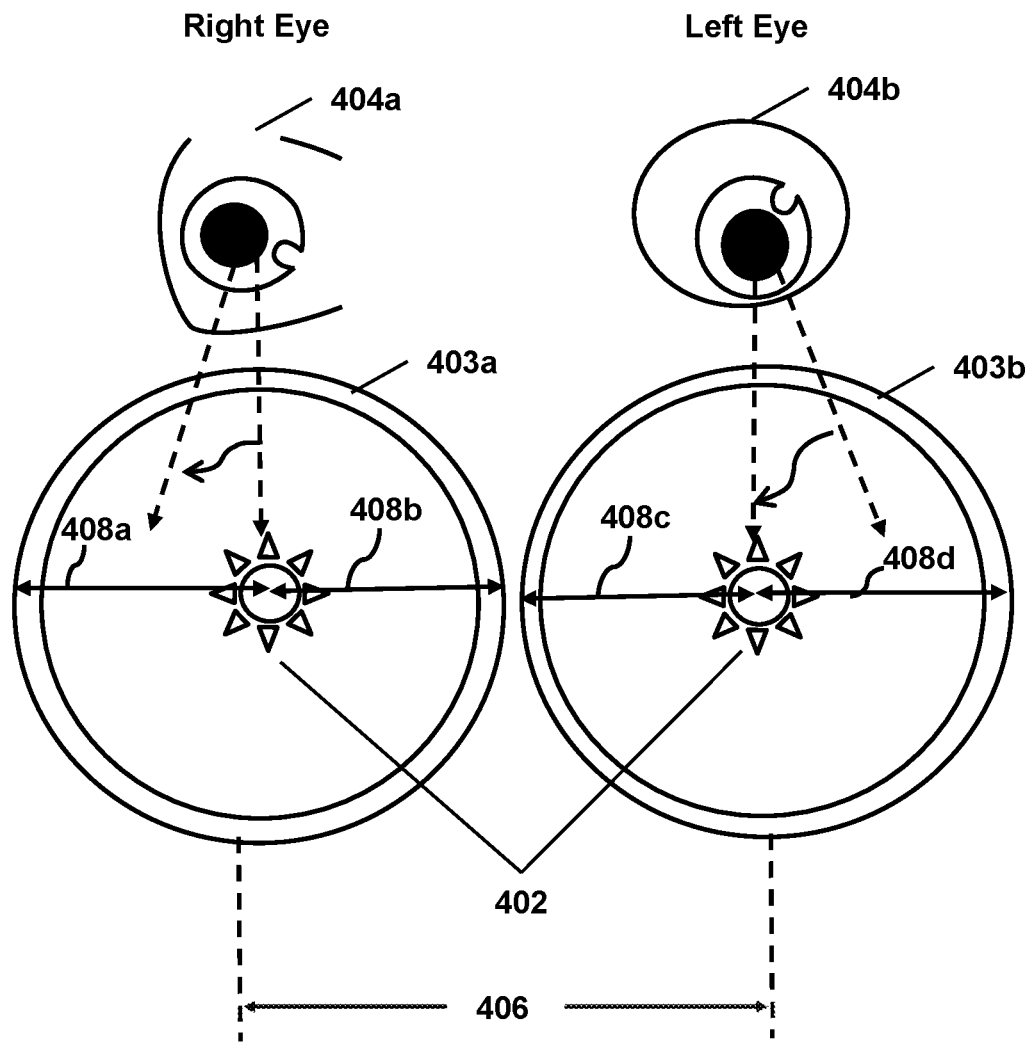

In some cases, eye crossing is alternating. This is due to there being no dominance of either eye of the user. Therefore, further testing may be performed to confirm deviation measurements for the eyes of the user. As indicated in FIG. 4G, a stimulus (e.g., the stimulus 402) may be presented at a position to both eyes 404*a* and 404*b* (e.g., at time t3) by presenting the stimulus on the left display 403*b* and on the right display 403*a*. In some embodiments, the stimuli may be presented at a central location (e.g., the middle, the center, etc.) of each display. If crossing is alternating (no dominance of either eye), the right eye 404*a* will stay fixating on the position, and the left eye 404*b* will stay crossed. If, however, the left eye 404*b* is the dominant eye (as indicated in FIG. 4G), the left eye 404*b* will instinctively move and fixate on the position. The movement of the left eye 404*b* will cause the right eye 404*a* to be crossed, resulting in the right eye 404*a*'s gaze direction being toward a different position. Testing subsystem 122 may measure the movement of the left eye 404*b* (e.g., via one or more eye tracking sensors) to determine or confirm the deviation measurement for the right eye 404*a* (e.g., the amount of movement of the left eye 404*b* may correspond to the amount of deviation of the right eye 404*a*).

Figure 4H:
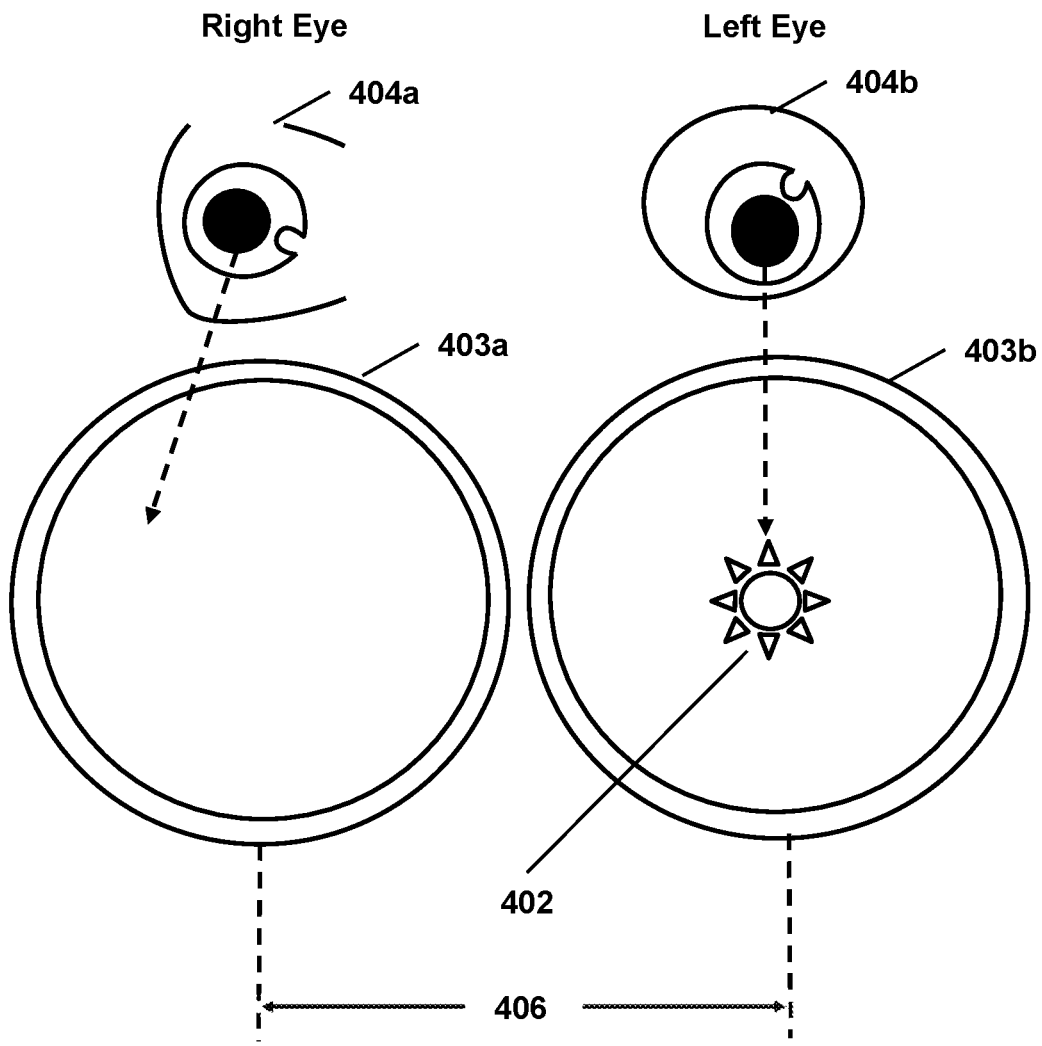

In a further use case, further testing may be performed to confirm the deviation measurement for the non-dominant eye. For example, as indicated in FIG. 4H, subsequent to one or more of the foregoing steps described with respect to FIGS. 4B-4E, a stimulus (e.g., stimulus 402) may be presented at a position only to the left eye 404*b* (e.g., at time t4) by presenting the stimulus on the left display 403*b* and not presenting a stimulus on the right display 403*a*. To the extent that the left eye 404*b* lost fixation (e.g., due to the presentation in FIG. 4G), the presentation in FIG. 4H will cause the left eye 404*b* to instinctively move to gain fixation on the position. The movement of the left eye 404*b* will cause the right eye 404*a* to be crossed, resulting in the right eye 404*a*'s gaze direction being toward a different position. Testing subsystem 122 may determine (e.g., via one or more eye tracking sensors) the deviation measurement for the right eye 404*a*. In some embodiments, testing subsystem 122 may confirm the deviation measurement by comparing the old (e.g., the previous deviation measurement for the right eye 404*a*) and the new deviation measurement. By confirming the deviation measurement in one or more eyes of the user, the system may use such deviation measurement information to determine (or select) a modified position for a stimulus with respect to one or more eyes of the user.

Figure 4I:
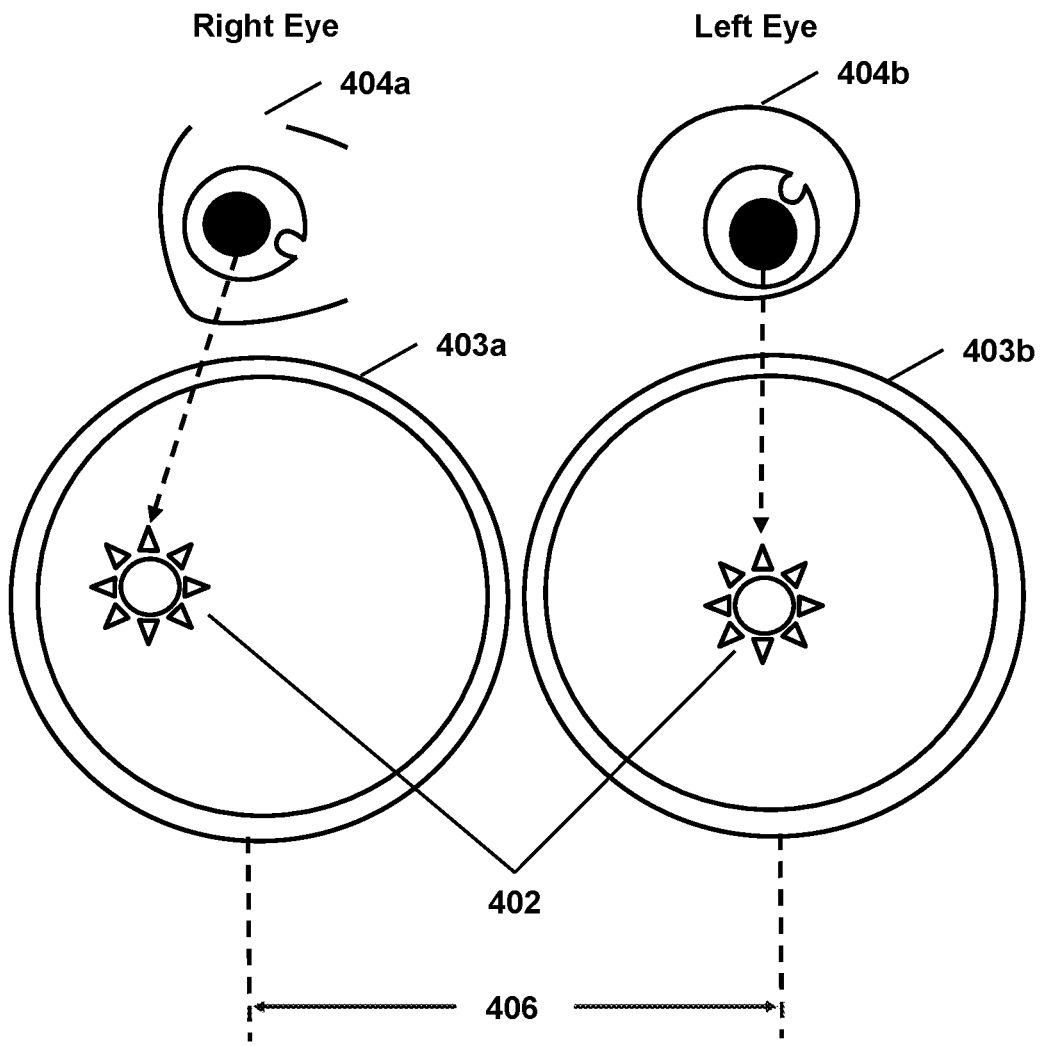

For example, testing subsystem 122 may select a location for a presentation of a stimulus based on the movement (e.g., deviation, eye gaze, other eye movement, etc.) of one or more eyes of the user. For example, if the right eye 404*a* is confirmed to have a deviation measurement (e.g., not a straight-line-of-sight), then the deviation measurement for the right eye may be used to determine a modified position for the right display 403*a*'s stimulus presentation. Testing subsystem 122 may select the determined modified position and present the stimulus (e.g., stimulus 402) at that modified position. As another example, if the left eye 404*b* is confirmed to have a deviation measurement, then the deviation measurement for the left eye may be used to determine a modified position for the left display 403*b*'s stimulus presentation. In some cases, where both eyes of the user have a deviation measurement, modified positions of the stimuli for each the right and left display 403*a*, 403*b* may respectively be based on the deviation measurement of each respective eyes of the user. As indicated in FIG. 4I, based on the deviation measurement for the right eye 404*a*, a modified position may be determined for presenting a stimulus to the right eye 404*a*. As such, while the stimulus 402 is being presented at the central position on the left display 403*b*, the stimulus 402 may be presented at the modified position on the right display 403*a* (e.g., at time t5).

Figure 4J:
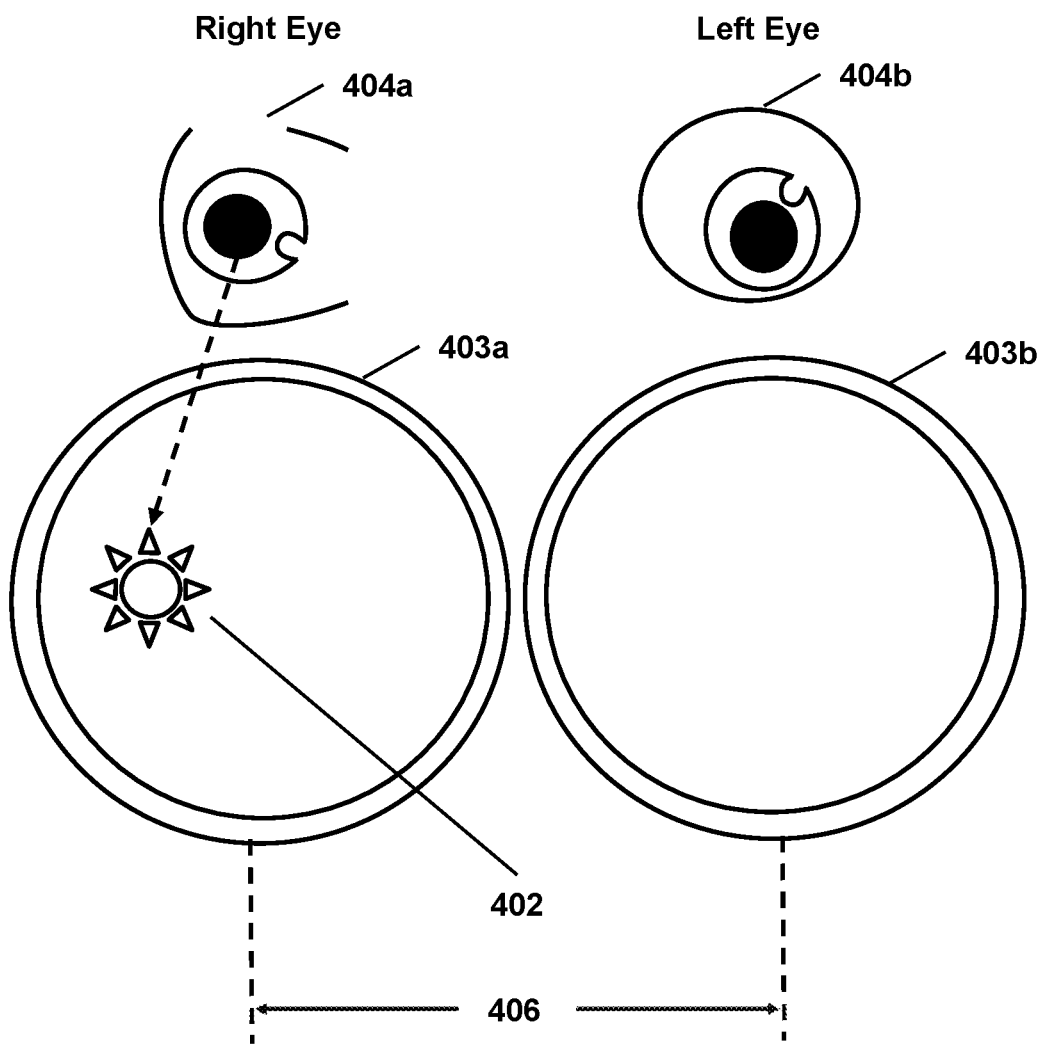
Figure 4K:
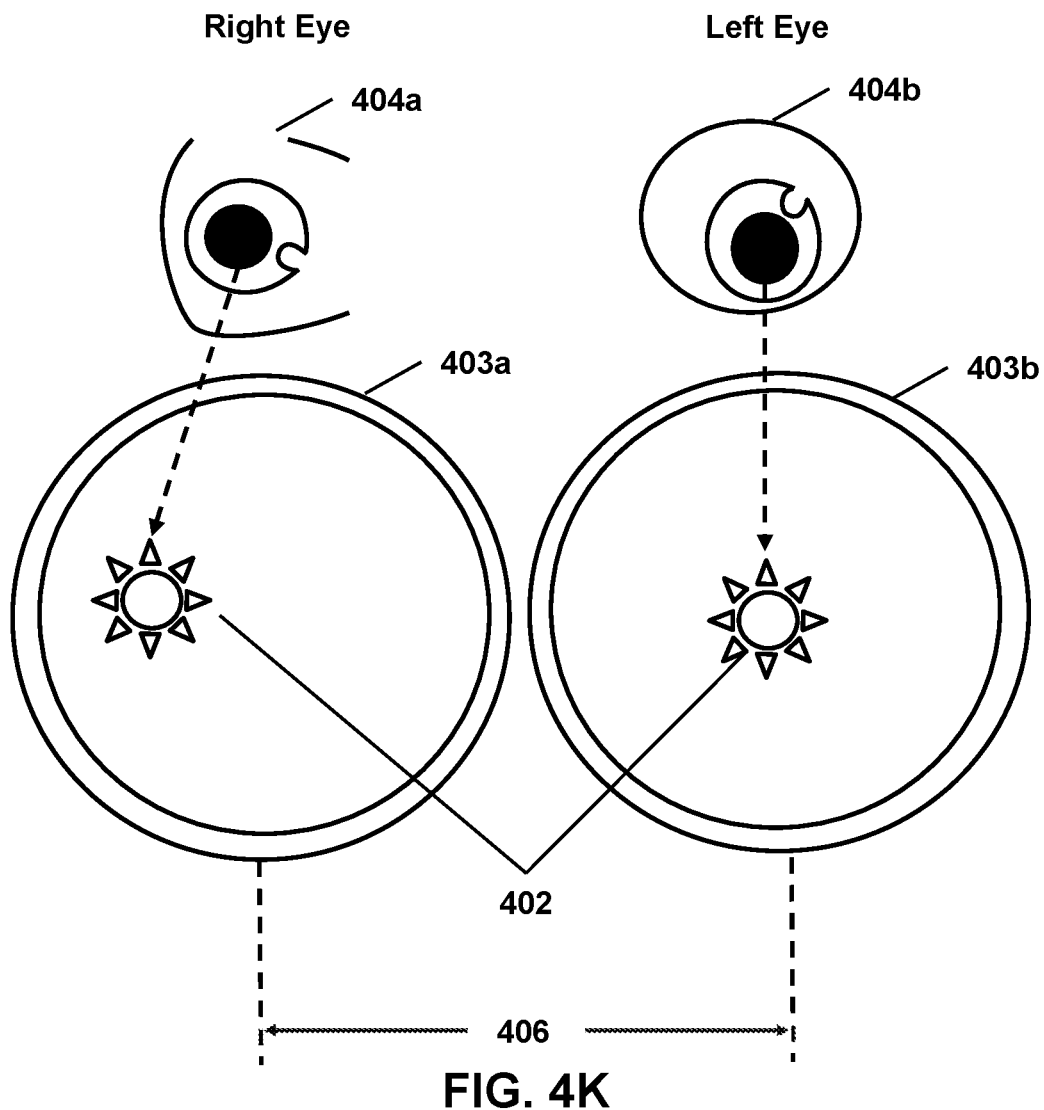

Subsequently, with respect to FIG. 4J, the stimulus 402 may only be presented to the right eye 404*a* (e.g., at time t6) by presenting the stimulus 402 at the modified position on the right display 403*a* and not presenting a stimulus on the left display 403*b*. Specifically, for example, the stimulus 402 is deviated to the right by the same amount as the deviation measured in one or more of the foregoing steps described with respect to FIGS. 4B-4E. If the deviation measurement is accurate, the right eye 404*a* will not move. If the deviation measurement is not accurate, the right eye 404*a* will slightly move, and the amount of movement may be measured by the wearable device (e.g., the pupil tracker of the wearable device) and the measurement of the slight movement may be used to fine tune the deviation. As an example, the measurement and the modified position may be used to determine an updated modified position for presenting a stimulus to the right eye 404*a*, and one or more of the steps described with respect to FIGS. 4H-4J may be repeated using the updated modified position. Additionally, or alternatively, one or more of the steps of FIGS. 4B-4E may be repeated to redetermine the deviation measurement for one or more eyes of the user (e.g., redetermining the deviation measurement for the right eye 404*a*). With respect to FIG. 4K, the stimuli 402 may then be presented to both eyes 404*a* and 404*b* (e.g., at time t7) by presenting the stimulus 402 at the modified position on the right display 403*a* and at the central position on the left display 403*b*. Because the stimulus 402 in front of the right eye 404*a* is deviated to the right in accordance with the deviation measurement (e.g., as determined or confirmed in one or more of the foregoing steps), the user is no longer seeing double. In this way, the pupil distance of the user may be determined more accurately (e.g., because the stimuli 402 for the deviating eye is now aligned with the user's eye alignment/eye gaze).

In some embodiments, during one or more visual tests, the gaze directions of one or more eye's of the user may be monitored to allow for testing subsystem 122 may determine the user's pupil distance (e.g., one or more pupil-related characteristics of the user), thereby causing one or more displays of the wearable device to be adjusted (e.g., based on the user's measured pupil distance). For example, a wearable device may include a pupil and line of sight tracker to detect the gaze direction of one or more eyes of the user or other eye-related characteristics. Testing subsystem 122 may determine that the user's gaze directions of the first and second eyes are consistent with one another in connection to the presentations of the stimuli and when they are presented. In some embodiments, the locations of the stimuli may be at the same location with respect to each display (e.g., the stimuli 402 are each at a central location with respect to each of the right display 403*a* and the left display 403*b*, the stimuli are each at the same non-central location with respect to each of the right display 403*a* and the left display 403*b*, etc.). In some embodiments, testing subsystem may measure the deviation of one or more eyes of the user during the visual tests to determine the user's gaze directions with respect to each of the user's eyes fixating on the location of each of the stimuli 402 and may further determine that the gaze directions are consistent with one another. For example, in some embodiments, if the gaze directions of each eye satisfy a gaze direction threshold amount (e.g., within 1 degree, 2 degrees, 3 degrees, 1 millimeter, 2 millimeters, 3 millimeters, or other threshold amount) with one another during the presentation of the respective stimuli, then testing subsystem 122 may determine that the gaze direction of each eye are consistent with one another. Based on the gaze directions being consistent with one another, one or more pupil-related characteristics of the user (e.g., the pupil distance of the user) may be determined based on (i) the respective locations of the stimuli on each display, (ii) a distance between the displays (e.g., right display 403ba and left display 403b), or (iii) the consistency determination.

Testing subsystem 122 may determine that the gaze directions of the eyes of the user that respectively occur when the stimuli are presented during the first and second times (e.g., as described above in reference to FIGS. 4C-4E) are consistent with one another based on feedback or other information obtained during one or more visual test presentations. For example, testing subsystem 122 may determine via one or more eye tracking sensors, a first gaze location for the first eye at the first time and a second gaze location for the second eye at the second time. In some embodiments, the second time may be a time subsequent to the first time. Testing subsystem 122 may determine a first difference based on the location of the presented stimulus for one eye of the user and first gaze location. For example, the user's right eye 404a may be fixated on a location that is near, but not exact to the location of the stimulus being presented on the right display 403a, and there may be a difference (e.g., in millimeters, degrees, or other metric) between the gaze location of the corresponding eye and the location of the stimuli. Similarly, testing subsystem 122 may determine a second difference based on the location of the presented stimulus for the other eye (e.g., the left eye 404b) of the user and second gaze location. Testing subsystem 122 may compare the first difference to the second difference. For example, if the first distance and the second distance satisfy a predetermined threshold difference (e.g., being within 1 millimeter, 2 millimeters, 3 millimeters, 1 degree, 2 degrees, 3 degrees, etc.), testing subsystem may determine that the gaze directions of the eyes of the user are consistent with one another. Based on the consistency determination (e.g., the gaze directions of one or more of the user's eyes with respect to the presentation of the stimuli are consistent with one another), one or more pupil-related characteristics (e.g., the pupil distance of the user) may be determined by testing subsystem 122, and one or more positions of one or more display portions of a wearable device may be adjusted based on the pupil related characteristics (e.g., the pupil distance of the user).

Additionally or alternatively, testing subsystem 122 may further determine that the gaze directions of the eyes of the user are substantially perpendicular to the displays of the wearable device. For example, by using one or more line of sight trackers of the wearable device, testing subsystem may determine that the gaze directions are substantially perpendicular to the displays of the wearable device (e.g., right display 403a, left display 403b, etc.). Based on the gaze directions being substantially perpendicular to the displays of the wearable device, testing subsystem 122 may determine a more accurate pupil distance of the user which may provide and more accurate adjustment of one or more displays of the wearable device.

In some embodiments, visioning subsystem 124 may feed (i) the gaze directions of the users eyes, (ii) the location of the stimuli being presented, or (iii) other information to a prediction model. The prediction model may generate an output including one or more pupil-related characteristics of a user (e.g., a pupil distance of the user, or other pupil characteristics of the user). Based on the pupil related characteristics of the user, the wearable device may adjust one or more positions of the display portions of the wearable device. In this way, for example, the wearable device may automatically improve the user experience by mitigating eye strain, headaches, blurry vision, distorted vision, or other eye-related issues, such as those related to the positioning or shape of displays that are not appropriate for the user.

In some embodiments, configuration subsystem 112 may store prediction models, visual defect information (e.g., indicating detected visual defects of a user), feedback information (e.g., feedback related to stimuli displayed to users or other feedback), or other information at one or more remote databases (e.g., in the cloud). In some embodiments, the feedback information, the visual defect information, or other information associated with multiple users (e.g., two or more users, ten or more users, a hundred or more users, a thousand or more users, a million or more users, or other number of users) may be used to train one or more prediction models. In one use case, where a prediction model being trained is a neural network or other machine learning model, model manager subsystem 114 may provide as input to the machine learning model (i) stimuli information (e.g., indicating a set of stimuli and their associated characteristics, such as intensity levels, locations at which a stimuli is to be displayed, etc.) and (ii) feedback information (e.g., indicating feedback related to the set of stimuli) to cause the machine learning model to predict visual defect information, or other outputs. Model manager subsystem 114 may provide reference information (e.g., visual defect information) to the machine learning model. The machine learning model may assess its predicted outputs (e.g., predicted visual defect information, etc.) against the reference information and update its configurations (e.g., weights, biases, or other parameters) based on its assessment of its predicted outputs. The foregoing operations may be performed with additional stimuli information (e.g., displayed to other users), additional feedback information (e.g., the other users' feedback related to the stimuli displayed to them), and additional reference information to further train the machine learning model (e.g., by providing such information as input and reference feedback to train the machine learning model, thereby enabling the machine learning model to further update its configurations).

In another use case, where the machine learning model is a neural network, connection weights may be adjusted to reconcile differences between the neural network's prediction and the reference information. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed.

In some embodiments, one or more prediction models may be trained or configured for a user or a type of device (e.g., a device of a particular brand, a device of a particular brand and model, a device having a certain set of features, etc.) and may be stored in association with the user or the device type. As an example, instances of a prediction model associated with the user or the device type may be stored locally (e.g., at a wearable device of the user or other user device) and remotely (e.g., in the cloud), and such instances of the prediction model may be automatically or manually synced across one or more user devices and the cloud to allow the user to have access to the latest configuration of the prediction model across any of the user devices or the cloud. In one use case, upon detecting that a first user is using a wearable device (e.g., when the first user logs into the user's account or is identified via one or more other techniques), configuration subsystem 112 may communicate with the wearable device to transmit the latest instance of a prediction model associated with the first user to the wearable device to allow the wearable device to have access to a local copy of the prediction model associated with the first user. In another use case, if a second user is later detected to be using the same wearable device, configuration subsystem 112 may communicate with the wearable device to transmit the latest instance of a prediction model associated with the second user to the wearable device to allow the wearable device to have access to a local copy of the prediction model associated with the second user.

Figure 5:
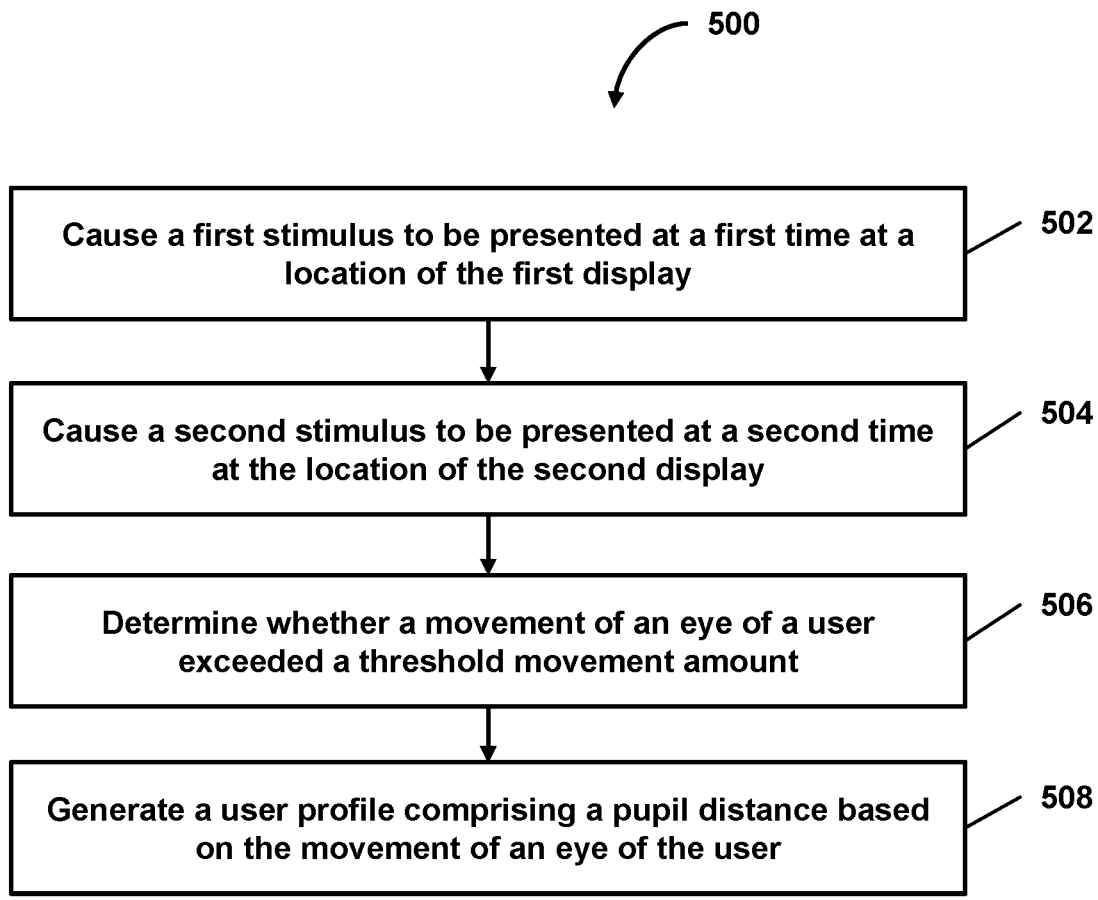
FIG. 5 shows a flowchart of a method of facilitating pupil distance detection or spectacles correction/adjustment based thereon, in accordance with one or more embodiments.

FIG. 5 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods.

FIG. 5 shows a flowchart of a method 500 for facilitating pupil distance detection and spectacles correction/adjustment based thereon, in accordance with one or more embodiments.

In operation 502, a first stimulus may be caused to be presented at a first time at a location of the first display of a head-mounted device. For example, a first eye of a user may be caused to fixate on a location on a first display of a head-mounted device by causing a stimulus to be presented for the first eye at a first time at the location of the first display of the head-mounted device. In some embodiments, the stimulus may include light stimuli, text, or images displayed to the user. In some embodiments, the location may be a central location (e.g., the center, the middle, or other central location) relative to the display. In other embodiments, the location may not be a central location (e.g., off center) relative to the display. Operation 502 may be performed by a subsystem that is the same or similar to testing subsystem 122, in accordance with one or more embodiments.

In operation 504, a second stimulus may be caused to be presented at a second time at the location of the second display of a head-mounted device. For example, a stimulus may be caused to be presented for a second eye of the user at the location on a second display of the head-mounted device at a second time subsequent to the first time. In some embodiments, the stimulus may include light stimuli, text, or images displayed to the user. In some embodiments, the location may be a central location (e.g., the center, the middle, or other central location) relative to the display. In other embodiments, the location may not be a central location (e.g., off center) relative to the display. Operation 504 may be performed by a subsystem that is the same or similar to testing subsystem 122, in accordance with one or more embodiments.

In operation 506, whether a movement of an eye of a user exceeded a threshold movement amount may be determined. For example, a determination of whether a movement of the first or second eye (e.g., an eye of the user) to fixate on the location on the respective first or second display in connection with the stimulus presentation at the second time exceeded a threshold movement amount may be determined. In some embodiments, movement of the first or second eye to fixate on the location on the respective first or second display in connection with the stimulus presentation at the second time exceeded a threshold movement amount may be determined. Operation 506 may be performed by a subsystem that is the same or similar to testing subsystem 122.

In an operation 508, a user profile may be generated. For example, the user profile may comprise a pupil distance of a user based on the movement of an eye of the user. For example, in response to determining that the movement of the first or second eye exceeded the threshold movement amount, a user profile may be generated comprising a pupil distance associated with the user, wherein the pupil distance is determined based on the movement of the first or second eye and specifies a distance between pupils of the first and second eyes. Operation 508 may be performed by a subsystem that is the same or similar to testing subsystem 122.

In some embodiments, the various computers and subsystems illustrated in FIG. 1A may include one or more computing devices that are programmed to perform the functions described herein. The computing devices may include one or more electronic storages (e.g., prediction database(s) 132, which may include training data database(s) 134, model database(s) 136, etc., or other electric storages), one or more physical processors programmed with one or more computer program instructions, or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A method comprising: causing a first stimulus to be presented at a first time at a location of a first display; causing a second stimulus to be presented at a second time at the location of the second display; determining whether a movement of an eye of the user exceeded a threshold movement amount in response to the presentation of the first or second stimulus; and generating, based on the determination and the movement of the eye, a user profile comprising one or more pupil-related characteristics associated with the user.

A2. The method of embodiment A1, further comprising: causing a first eye of a user to fixate on the location of the first stimulus on the first display based on the presentation of the first stimulus on a user device; causing a second eye of the user to fixate on the location of the second stimulus based on the presentation of the second stimulus on the user device; determining, via one or more eye tracking sensors, whether the movement of the first or second eye to fixate on the location on the respective first or second display in connection with the stimulus presentation at the second time exceeded a threshold movement amount; and in response to determining that the movement of the first or second eye exceeded the threshold movement amount and the movement of the first or second eye, generating a user profile comprising one or more pupil-related characteristics associated with the user.

A3. The method of any of embodiments A1-A2, wherein the location on the first display is a central location on the first display, and wherein the location on the second display is the central location on the second display.

A4. The method of any of embodiments A1-A2, wherein generating the user profile comprises generating the user profile in response to determining that a movement of the second eye exceeded the threshold movement amount in connection with the stimulus presentation at the second time, and wherein the one or more pupil-related characteristics are determined based on the movement of the second eye.

A5. The method of any of embodiments A1-A4, further comprising: in response to determining that the movement of the first or second eye exceeded the threshold movement amount, adjusting one or more positions of the first or second displays based on the one or more pupil-related characteristics of the user profile such that the adjustment causes a distance between the first and second displays to change from a first distance to a second distance apart on the user device.

A6. The method of embodiment A5, wherein adjusting the one or more positions of the first or second displays comprises adjusting, based on the one or more pupil-related characteristics of the user profile, the one or more positions of the first or second displays in response to determining that a movement of the second eye exceeded the threshold movement amount in connection with the stimulus presentation at the second time, and wherein the one or more pupil-related characteristics are determined based on the movement of the second eye.

A7. The method of any of embodiments A5-A6, wherein adjusting the one or more positions of the first or second displays comprises adjusting a position of the first display and a position of the second display based on the one or more pupil-related characteristics of the user profile, and wherein the one or more pupil-related characteristics are determined based on the movement of the second eye.

A8. The method of any of embodiments A1-A7, further comprising: causing a first stimulus to be presented on the first display of the user device and a second stimulus to be presented on the second display of the user device; determining, via the one or more eye tracking sensors, whether gaze directions of the first and second eyes that respectively occur in connection with the presentations of the first and second stimuli are consistent with one another; and in response to determining that the gaze directions of the first and second eyes are consistent with one another, determining the one or more pupil-related characteristics associated with the user based on (i) a location of the first stimulus on the first display, (ii) a location of the second stimulus on the second display, and (iii) a distance between the first and second displays.

A9. The method of any of embodiments A1-A8, wherein determining the one or more pupil-related characteristics comprises determining the one or more pupil-related characteristics associated with the user based on (i) the location of the first stimulus on the first display, (ii) the location of the second stimulus on the second display, and (iii) the distance between the first and second displays, in response to determining that the gaze directions of the first and second eyes are both substantially perpendicular to the first and second displays, respectively.

A10. The method of any of embodiments A1-A9, further comprising: selecting the location of the first or second stimulus based on the movement of the first or second eye, wherein the presentations of the first and second stimuli are based on the selection of the location of the first or second stimulus.

A11. The method of any of embodiments A1-A10, further comprising: selecting the locations of the first and second stimuli based on the movement of the first or second eye, wherein the presentations of the first and stimuli are based on the selection of the locations of the first and second stimuli.

A12. The method of any of embodiments A1-A11, wherein the stimulus presentation at the second time occurs while a stimulus is not presented on the first display.

A13. The method of any of embodiments A1-A12, wherein the stimulus presentation at the first time occurs while a stimulus is not presented on the second display, and wherein the stimulus presentation at the second time occurs while a stimulus is not presented on the first display.

A14. The method of any of embodiments A1-A13, wherein the stimulus presentation at the first time occurs while a stimuli intensity of the second display does not satisfy a stimuli intensity threshold, and wherein the stimulus presentation at the second time occurs while a stimuli intensity of the first display does not satisfy the stimuli intensity threshold.

A15. The method of any of embodiments A1-14, wherein one or more of the foregoing operations are performed by a user device.

A16. The method of any of embodiments A1-A15, wherein the user device comprises a wearable device.

A17. The method of embodiment A16, wherein the wearable device comprises one or more display portions configured to display one or more images (e.g., stimuli).

A18. The method of any of embodiments A16-A17, wherein the one or more display portions comprise first and second display portions of the wearable device.

A19. The method of any of embodiments A16-A18, wherein the wearable device comprises a first monitor comprising the first display portion and a second monitor comprising the second display portion.

A20. The method of any of embodiments A16-A19, wherein the one or more display portions comprise one or more dynamic display portions on one or more transparent displays of the wearable device.

A21. The method of any of embodiments A16-A20, wherein the wearable device comprises a wearable spectacles device.

A22. The method of any of embodiments A1-A21, wherein the one or more pupil-related characteristics comprise a pupil distance between pupils of the user, one or more pupil sizes of one or more pupils of the user, one or more curvatures of the one or more pupils of the user, or other pupil characteristics of the one or more pupils of the user.

B1. A method comprising: causing a stimulus to be presented for the first eye of a user at a first time on a first display; causing a second stimulus to be presented for a second eye of the user at a second time on a second display; determine whether gaze directions of the first and second eyes are consistent with one another in connection with the stimulus presentations at the first and second times; and determine one or more pupil-related characteristics of a user based on the consistency determination and the locations of the first and second stimuli.

B2. The method of embodiment B1, further comprising: causing a first eye of a user to fixate on the location of the first stimulus on the first display of the user device based on the stimulus being presented for the first eye at the first; causing the second eye of the user to fixate on the location of the second stimulus on the second display of the user device based on the second stimulus being presented for the second eye at the second time subsequent to the first time; determining, via one or more eye tracking sensors, whether the gaze directions of the first and second eyes that respectively occur in connection with the stimulus presentations at the first and second times are consistent with one another; and in response to determining that the gaze directions of the first and second eyes are consistent with one another, determining the one or more pupil-related characteristics of a user based on the consistency determination and the locations of the first and second stimuli.

B3. The method of any of embodiments B1-B2, further comprising in response to determining the one or more pupil-related characteristics of a user, adjusting one or more positions of the first or second displays based on the one or more pupil-related characteristics such that the adjustment causes a distance between the first and second displays to change from the first distance to a second distance apart on the user device.

B4. The method of any of embodiments B2-B3, wherein determining whether gaze directions of the first and second eyes that respectively occur in connection with the stimulus presentations of at the first and second times are consistent with one another further comprises: determining, via the one or more eye tracking sensors, a first gaze location for the first eye at the first time and a second gaze location for the second eye at the second time; determining a first difference, wherein the first difference is based on the location of the presented stimulus for the first eye and the first gaze location; determining a second difference, wherein the second difference is based on the location of the presented stimulus for the second eye and the second gaze location; comparing the first difference to the second difference; and in response to the first difference and the second difference satisfying a predetermined threshold difference, determining that the gaze directions of the of the first and second eyes are consistent with one another.

B5. The method of any of embodiments B1-B4, wherein determining the one or more pupil-related characteristics of a user are further based on a location of the first stimulus on the first display and a location of the second stimulus on the second display.

B6. The method of any of embodiments B1-B5, wherein the stimulus presentation at the second time occurs while a stimulus is not presented on the first display.

B7. The method of any of embodiments B1-B5, wherein the stimulus presentation at the first time occurs while a stimulus is not presented on the second display, and wherein the stimulus presentation at the second time occurs while a stimulus is not presented on the first display.

B8. The method of any of embodiments B1-B7, wherein determining the one or more pupil-related characteristics of the user is further based on (i) respective distances between the location and an edge of each of the first and second displays and (ii) a first distance between the first and second displays.

B9. The method of any of embodiments B1-B8, wherein one or more of the foregoing operations are performed by a user device.

B10. The method of embodiment B9, wherein the user device comprises a wearable device.

B11. The method of embodiment B10, wherein the wearable device comprises one or more display portions configured to display one or more images (e.g., stimuli)

B12. The method of any of embodiments B10-B11, wherein the one or more display portions comprise first and second display portions of the wearable device.

B13. The method of any of embodiments B10-B12, wherein the wearable device comprises a first monitor comprising the first display portion and a second monitor comprising the second display portions.

B14. The method of any of embodiments B10-B13, wherein the one or more display portions comprise one or more dynamic display portions on one or more transparent displays of the wearable device.

B15. The method of any of embodiments B10-B14, wherein the wearable device comprises a wearable spectacles device.

B16. The method of any of embodiments B1-B15, wherein the one or more pupil related characteristics comprise a pupil distance between pupils of the user, one or more pupil sizes of one or more pupils of the user, one or more curvatures of the one or more pupils of the user, or other pupil characteristics of the one or more pupils of the user.

C1. A tangible, non-transitory, machine-readable medium storing instructions that, when executed by a data processing apparatus, cause the data processing apparatus to perform operations comprising those of any of embodiments A1-A22 or B1-B16.

C2. A system comprising: one or more processors; and memory storing instructions that, when executed by the processors, cause the processors to effectuate operations comprising those of any of embodiments A1-A22 or B1-B16.

What is claimed is:

1. A system comprising:

one or more processors executing computer program instructions that, when executed, cause operations comprising:

causing a first eye of a user to fixate on a location on a first display portion of a head-mounted device by causing a stimulus to be presented for the first eye at a first time at the location on the first display portion of the head-mounted device;

causing a stimulus to be presented for a second eye of the user at the location on a second display portion of the head-mounted device at a second time subsequent to the first time;

determining, via one or more eye tracking sensors, that a movement of the first or second eye to fixate on the location on the respective first or second display portion in connection with the stimulus presentation at the second time exceeded a threshold movement amount; and in response to determining that the movement of the first or second eye exceeded the threshold movement amount, generating a user profile comprising a pupil distance associated with the user, wherein the pupil distance specifies a distance between pupils of the first and second eyes and is determined based on (i) the movement of the first or second eye, (ii) a first location of a first stimulus on the first display portion, (iii) a second location of a second stimulus on the second display portion, and (iv) a distance between the first and second display portions.

2. A method comprising:

causing a first eye of a user to fixate on a location on a first display portion of a head-mounted device by causing a stimulus to be presented for the first eye at a first time at the location on the first display portion of the head-mounted device;

causing a stimulus to be presented for a second eye of the user at the location on a second display portion of the head-mounted device at a second time subsequent to the first time;

determining, via one or more eye tracking sensors, that a movement of the first or second eye to fixate on the location on the respective first or second display portion in connection with the stimulus presentation at the second time exceeded a threshold movement amount; and determining a pupil distance associated with the user based on (i) the movement of the first or second eye exceeding the threshold movement amount, (ii) a first location of a first stimulus on the first display portion, (iii) a second location of a second stimulus on the second display portion, and (iv) a distance between the first and second display portions.

3. The method of claim 2, wherein the location on the first display portion is a central location on the first display portion, and wherein the location on the second display portion is the central location on the second display portion.

4. The method of claim 2, wherein:

determining that the movement of the first or second eye exceeded the threshold movement amount comprises determining that a movement of the second eye exceeded the threshold movement amount in connection with the stimulus presentation at the second time;

wherein determining the pupil distance comprises determining the pupil distance based on (i) the movement of the second eye exceeding the threshold movement amount, (ii) the first location of the first stimulus on the first display portion, (iii) the second location of the second stimulus on the second display portion, and (iv) the distance between the first and second display portions.

5. The method of claim 2, further comprising:
adjusting, based on the movement of the first or second eye exceeding the threshold movement amount, one or more positions of the first or second display portions based on the pupil distance such that the adjustment causes the distance between the first and second display portions to change from a first distance to a second distance apart on the head-mounted device.

6. The method of claim 5, wherein:
determining that the movement of the first or second eye exceeded the threshold movement amount comprises determining that a movement of the second eye exceeded the threshold movement amount in connection with the stimulus presentation at the second time;
determining the pupil distance comprises determining the pupil distance based on (i) the movement of the second eye exceeding the threshold movement amount, (ii) the first location of the first stimulus on the first display portion, (iii) the second location of the second stimulus on the second display portion, and (iv) the distance between the first and second display portions; and
adjusting the one or more positions of the first or second display portions comprises adjusting, based on the pupil distance, the one or more positions of the first or second display portions.

7. The method of claim 5, wherein adjusting the one or more positions of the first or second display portions comprises adjusting a position of the first display portion and a position of the second display portion based on the pupil distance.

8. The method of claim 2, further comprising:
causing the first stimulus to be presented on the first display portion of the head-mounted device and the second stimulus to be presented on the second display portion of the head-mount device;
determining, via the one or more eye tracking sensors, that gaze directions of the first and second eyes that respectively occur in connection with the presentations of the first and second stimuli are consistent with one another; and
determining, based on the gaze directions of the first and second eyes being consistent with one another, the pupil distance associated with the user based on (i) the first location of the first stimulus on the first display portion, (ii) the second location of the second stimulus on the second display portion, and (iii) the distance between the first and second display portions.

9. The method of claim 8, determining that the gaze directions of the first and second eyes are consistent with one another comprises determining that the gaze directions of the first and second eyes are both substantially perpendicular to the first and second display portions, respectively.

10. The method of claim 2, further comprising:
selecting the location of the first or second stimulus based on the movement of the first or second eye,
wherein the presentations of the first and second stimuli are based on the selection of the location of the first or second stimulus.

11. The method of claim 2, wherein the stimulus presentation at the second time occurs while a stimulus is not presented on the first display portion.

12. The method of claim 2, wherein the stimulus presentation at the first time occurs while a stimulus is not presented on the second display portion, and wherein the stimulus presentation at the second time occurs while a stimulus is not presented on the first display portion.

13. The method of claim 2, wherein the stimulus presentation at the first time occurs while a stimuli intensity of the second display portion does not satisfy a stimuli intensity threshold, and wherein the stimulus presentation at the second time occurs while a stimuli intensity of the first display portion does not satisfy the stimuli intensity threshold.

14. The method of claim 2, wherein the first display portion is on a first display device of the head-mounted device, and the second display portion is on a second display device of the head-mounted device.

15. One or more non-transitory computer-readable media storing instructions that, when executed by one or more processors, cause operations comprising:
causing a first eye of a user to fixate on a location on a first display portion of a user device by causing a stimulus to be presented for the first eye at a first time at the location on the first display portion of the user device;
causing a stimulus to be presented for a second eye of the user at the location on a second display portion of the user device at a second time subsequent to the first time;
determining, via one or more eye tracking sensors, whether gaze directions of the first and second eyes that respectively occur in connection with the stimulus presentations at the first and second times are consistent with one another; and
determining, based on the gaze directions of the first and second eyes being consistent with one another, a pupil distance between pupils of the first and second eyes based on (i) respective distances between the location and an edge of each of the first and second display portions and (ii) a first distance between the first and second display portions.

16. The one or more non-transitory computer-readable media of claim 15, further causing operations comprising:
adjusting one or more positions of the first or second display portions based on the pupil distance such that the adjustment causes the distance between the first and second display portions to change from the first distance to a second distance apart on the user device.

17. The one or more non-transitory computer-readable media of claim 15, wherein determining whether gaze directions of the first and second eyes that respectively occur in connection with the stimulus presentations at the first and second times are consistent with one another further comprises:
determining, via the one or more eye tracking sensors, a first gaze location for the first eye at the first time and a second gaze location for the second eye at the second time;
determining a first difference, wherein the first difference is based on the location of the presented stimulus for the first eye and the first gaze location;
determining a second difference, wherein the second difference is based on the location of the presented stimulus for the second eye and the second gaze location;
comparing the first difference to the second difference; and
in response to the first difference and the second difference satisfying a predetermined threshold difference, determining that the gaze directions of the of the first and second eyes are consistent with one another.

18. The one or more non-transitory computer-readable media of claim 15, wherein determining the pupil distance between pupils of the first and second eyes are further based on a first location of the first stimulus on the first display portion and a second location of the second stimulus on the second display portion.

19. The one or more non-transitory computer-readable media of claim 15, wherein the stimulus presentation at the second time occurs while a stimulus is not presented on the first display portion.

20. The one or more non-transitory computer-readable media of claim 15, wherein the stimulus presentation at the first time occurs while a stimulus is not presented on the second display portion, and wherein the stimulus presentation at the second time occurs while a stimulus is not presented on the first display portion.

\* \* \* \* \*